United States Patent
Brooker et al.

(10) Patent No.: US 11,537,421 B1
(45) Date of Patent: Dec. 27, 2022

(54) VIRTUAL MACHINE MONITOR PROVIDING SECURE CRYPTOGRAPHIC OPERATIONS

(71) Applicant: Amazon Technologies, Inc., Seattle, WA (US)

(72) Inventors: Marc John Brooker, Seattle, WA (US); Ajay Nair, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 722 days.

(21) Appl. No.: 16/435,279

(22) Filed: Jun. 7, 2019

(51) Int. Cl.
| | |
|---|---|
| *G06F 9/455* | (2018.01) |
| *H04L 9/08* | (2006.01) |
| *G06F 21/60* | (2013.01) |
| *G06F 13/42* | (2006.01) |

(52) U.S. Cl.
CPC ........ *G06F 9/45558* (2013.01); *G06F 9/4555* (2013.01); *G06F 13/4221* (2013.01); *G06F 21/602* (2013.01); *H04L 9/0894* (2013.01); *G06F 2009/45587* (2013.01); *G06F 2213/0024* (2013.01)

(58) Field of Classification Search
CPC ............... G06F 9/45558; G06F 9/4555; G06F 13/4221; G06F 21/602; G06F 2009/45587; G06F 2213/0024; H04L 9/0894

See application file for complete search history.

(56) References Cited

U.S. PATENT DOCUMENTS

| | | | |
|---|---|---|---|
| 8,812,871 B2 | 8/2014 | Monclus et al. | |
| 8,856,504 B2 | 10/2014 | Maino et al. | |
| 9,037,854 B2 | 5/2015 | Roth et al. | |
| 9,784,260 B2 | 10/2017 | Lee et al. | |
| 10,623,390 B1* | 4/2020 | Rosenhouse | ........ H04L 67/1002 |
| 2003/0163723 A1* | 8/2003 | Kozuch | ................... G06F 21/57 726/34 |
| 2006/0095690 A1 | 5/2006 | Craddock et al. | |
| 2010/0153749 A1* | 6/2010 | Sakai | .................. G06F 21/6236 710/22 |
| 2010/0199104 A1* | 8/2010 | Van Rijnswou | ........ G06F 21/72 713/189 |
| 2013/0067245 A1* | 3/2013 | Horovitz | ................. G06F 21/57 713/193 |

(Continued)

*Primary Examiner* — Dong U Kim
(74) *Attorney, Agent, or Firm* — Robert C. Kowert; Kowert, Hood, Munyon, Rankin & Goetzel, P.C.

(57) ABSTRACT

Computer systems and methods are disclosed to implement a virtual machine monitor (VMM) that stores cryptographic keys for guest virtual machines (VMs) and securely executes cryptographic operations on the VMs' behalf using the stored cryptographic keys. The cryptographic keys are maintained in a key store that is accessible to the VMM but not accessible to the guest VMs. The cryptographic operations are executed in a manner that does not reveal the cryptographic keys to the guest VMs. In embodiments, the guest VMs may invoke the cryptographic operations via a device driver, a memory access interface, or some other mechanism. Advantageously, the guest VMs cannot obtain the cryptographic keys in their own memory space, so that the keys cannot be exfiltrated from the guest VMs. Embodiments of the VMM may be used to implement cryptographic operations such as request signing and verification, data encryption and decryption, and others.

20 Claims, 13 Drawing Sheets

(56) References Cited

U.S. PATENT DOCUMENTS

| | | | |
|---|---|---|---|
| 2015/0319160 A1* | 11/2015 | Ferguson | G06F 21/6281 |
| | | | 726/10 |
| 2016/0366130 A1* | 12/2016 | Jung | G06F 9/45558 |
| 2017/0063547 A1* | 3/2017 | Brandt | G06F 21/53 |
| 2017/0091487 A1* | 3/2017 | Lemay | H04L 9/3234 |
| 2018/0069844 A1 | 3/2018 | Cignetti et al. | |
| 2018/0218156 A1* | 8/2018 | He | G06F 21/57 |
| 2019/0394219 A1* | 12/2019 | Huang | H04L 63/1425 |
| 2020/0084202 A1* | 3/2020 | Smith | H04L 67/12 |
| 2020/0278892 A1* | 9/2020 | Nainar | G06F 9/541 |
| 2020/0344233 A1* | 10/2020 | Lai | G06Q 40/04 |
| 2020/0358802 A1* | 11/2020 | Viswambharan | H04L 63/105 |

* cited by examiner

US 11,537,421 B1

VIRTUAL MACHINE MONITOR PROVIDING SECURE CRYPTOGRAPHIC OPERATIONS

BACKGROUND

Virtualization of hardware provides numerous benefits for managing large-scale computing resources for clients with diverse needs, allowing various computing resources to be efficiently shared by multiple clients. For example, machine virtualization allows a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a physical computing machine. Some virtualization technologies are capable of providing virtual resources that span two or more physical resources, such as a single virtual machine with multiple virtual processors that spans multiple distinct physical hosts. In most virtualization systems, the single physical computing device can create, maintain, or delete virtual machines in a dynamic manner. In turn, users can request computer resources from a service provider and be provided with varying numbers of virtual machine resources on an on-demand basis.

In some situations, guest virtual machines hosted on physical virtualization hosts may need to perform cryptographic operations (e.g., signing or authentication of messages, encryption or decryption of data, etc.) that use cryptographic keys. In many cases, these cryptographic keys must be kept secure from exfiltration. However, in a large virtualization environment servicing a large number of different clients, the clients' cryptographic keys are often stored on their guest virtual machines, which may implement highly complex and variable computing environments. It is generally difficult to protect these keys from being accidentally or maliciously exfiltrated from such environments. The problem is aggravated in situations where virtual machine instances are recycled or shared among the multiple clients, or where the virtual machines are configured with the capability to perform highly privileged actions. Although specialized hardware devices can be added to store these keys, such hardware solutions are generally costly, require user applications to be specifically programmed to rely on the hardware devices, and are not readily scalable for large numbers of virtual machine instances. There is a general need in the field for a more practical solution to securely store cryptographic keys for large numbers of virtual machines.

Figure 1:
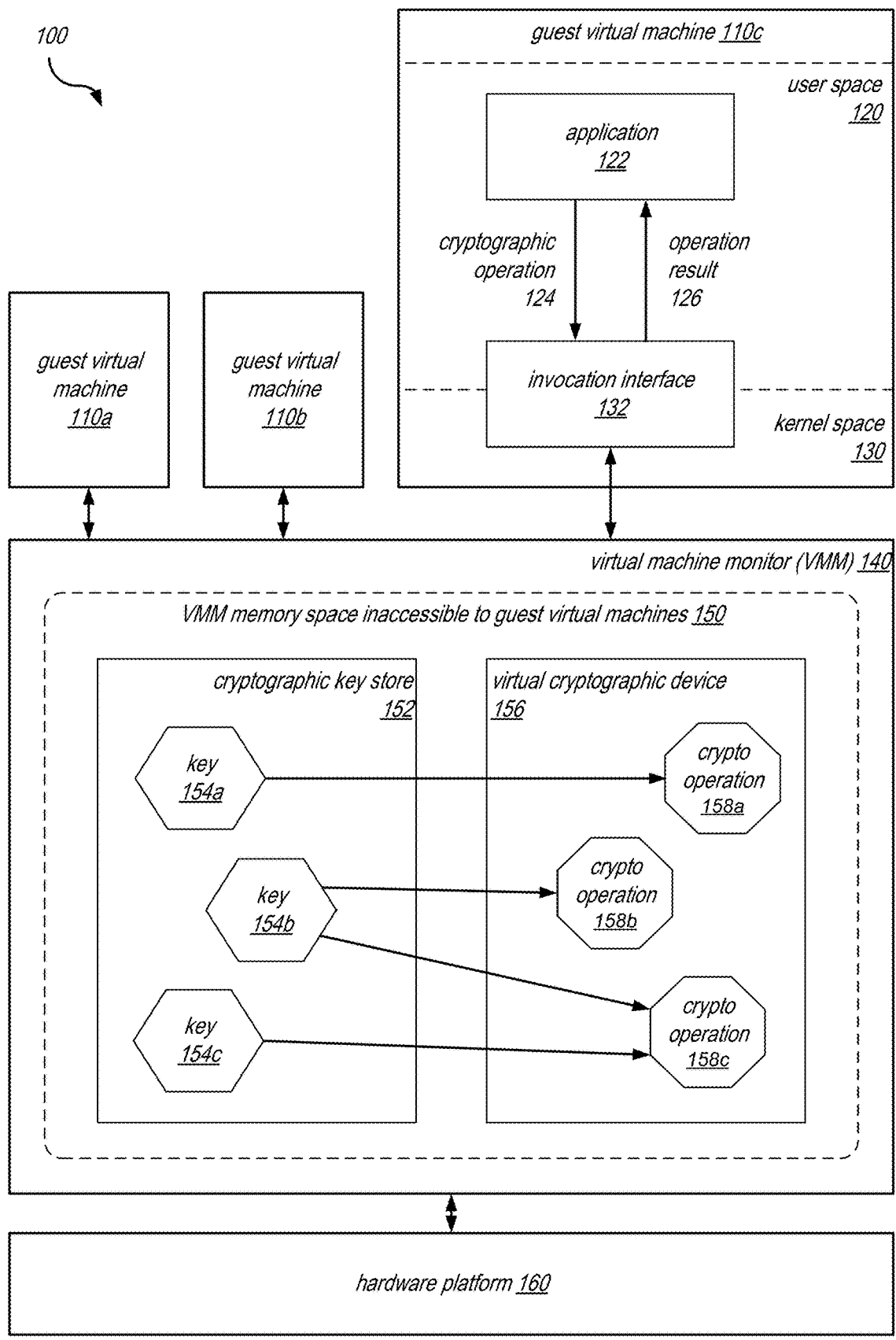
FIG. 1 is a block diagram illustrating an example virtual machine monitor (VMM) configured to securely store cryptographic keys and perform cryptographic operations for guest virtual machines (VMs), according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Systems and methods are disclosed herein to implement a virtual machine monitor (VMM) configured to securely store cryptographic keys for guest virtual machines (VMs) and perform cryptographic operations on behalf of the guest VMs.

Embodiments of the VMM disclosed herein allows guest VMs hosted on the VMM to invoke one or more cryptographic operations that uses one or more cryptographic keys, which are securely stored by the VMM. In embodiments, the cryptographic key is stored in a memory space of the VMM (e.g., in a secure key store) that is accessible to the VMM but not accessible to the guest VM invoking the cryptographic operation. In some embodiments, the VMM is configured to perform the cryptographic operation on behalf of the guest VM, in a manner that does not reveal the cryptographic key to the guest VM. For example, the cryptographic operation may be executed in the VMM memory space or some other memory inaccessible to the guest VM. The VMM may then return any result of the cryptographic operation to the guest VM.

Depending on the embodiment, the cryptographic operation may be any operation that uses a cryptographic key, which may include signing a message, authenticating a signed message, encrypting a data, decrypting a data, performing a key-based computation such as generating a pseudorandom value, etc. In some embodiments, the cryptographic key may be part of a credential that is associated with or assigned to the particular VM instance, an execution container on the instance, or a particular application or client identifier. The cryptographic key may be used to sign messages (e.g. requests) issued by the VM instance, container, application, or client, so that a recipient of the message (e.g. a service endpoint) can verify that the message was issued by the VM instance, container, application, or client.

In some embodiments, the cryptographic operation may be implemented by the VMM in a virtual cryptographic device. For example, in some embodiments, the virtual cryptographic device may be exposed as a storage device (e.g. a block storage device) that automatically encrypts all data written to the device using a particular cryptographic key. For example, the write operation may use the key to encrypt a data, and the read operation may use the key to decrypt the data. As another example, the cryptographic device may be presented to the guest VM as a network device, such as a virtual router or network interface card (NIC) that automatically signs outgoing messages and/or authenticates incoming messages. In some embodiments, the virtual cryptographic device may be implemented with the capability to perform multiple cryptographic operations using different cryptographic keys. In some embodiments, the virtual cryptographic device may execute in a system memory of the virtualization host that is inaccessible to the guest VM invoking the cryptographic operation. In some embodiments, the virtual cryptographic device may be exposed to the guest VM via a device driver, which may be a paravirtualized device driver that has been programmed to make specific calls to modules or components in the VMM. In some embodiments, the virtual cryptographic device may not provide any special access interface or protocol for invoking the cryptographic operation. Rather, applications running on the guest VM need only be aware of the special semantics of the virtual cryptographic device (e.g., a packet sent to a particular port of a virtual router will be automatically signed, a data written to a particular block of a storage volume will be automatically encrypted, etc.). In this manner, application programs do not need to rely any specialized libraries to invoke cryptographic operations using the VMM.

In some embodiments, the cryptographic operation may be implemented by the VMM using a special memory access interface exposed to the guest VM. In some embodiments, the memory access interface may provide a designated area in the guest VM memory that may be used to invoke the cryptographic operation. For example, in some embodiments, the guest operating system (OS) of the guest VM may allow applications to write a special area in the VM's memory space, so that data written to that area will be automatically transformed by a particular cryptographic operation associated with a particular key. For example, in some embodiments, a write to a particular memory address in the guest VM will cause the data written to be automatically signed with a cryptographic key. In some embodiments, the VMM may detect the write to the designated memory area by providing a range of memory pages for the guest VM that will always cause a page fault when accessed. When a page is accessed in the designated area, a page fault will be raised in the VMM and cause the VMM to trap into a handling routing to perform the cryptographic operation on the memory page.

In some embodiments, the cryptographic keys may be introduced to the VMM via a key injection interface or configuration interface of the VMM. In some embodiments, the VMM may provide an interface to clients to allow clients to add client-specific cryptographic operations or cryptographic keys to the VMM, which may be used by virtual machines or client applications that will be hosted on the VMM. In some embodiments, such configuration of the VMM may occur as part of an automated provisioning process that provisions VMs to the VMM in a large service provider network that provides virtualization services. For example, in some embodiments, at the time that a new VM is provisioned to a virtualization host, the service provider network control plane may cause a credential for that VM (e.g. a unique key for that VM) to be injected into the VMM's secure key store. In some embodiments, the credential may be generated by or registered in an identity and access management (IAM) system of the service provider network, which may maintain permissions about the credential. In this manner, requests or messages generated by the VM can be signed or encrypted by that VMM, using the injected cryptographic key for the VM.

As may be understood, embodiments of the VMM described herein provides a number of technical advantages over conventional systems for cryptographic key storage and cryptographic operation execution, improving the functionality of these conventional systems. In one respect, the disclosed VMM does not allow a secret cryptographic key to be made available to the guest VM, so that risk of exfiltration of the key from the guest VM is eliminated. The security of the system is further improved due to the fact that the cryptographic operation itself is performed without revealing the key to the guest VM during the execution of the cryptographic operation, for example, in a memory inaccessible to the guest VM. The disclosed solutions can be implemented in a straightforward manner, by taking advantage of existing isolation guarantees provided by the VMM system. Moreover, embodiments of the VMM described herein provides a variety of invocation interfaces for guest VM applications to invoke cryptographic operations. The invocation interface may be implemented using existing OS interfaces such as device drivers, OS system calls, and the like, so that the applications do not need to rely on additional libraries to invoke the cryptographic operations. In some embodiments, these OS interfaces may be the standard interfaces provided by the OS (such as a standard device driver), which are unmodified by the VMM's cryptographic features, so that the applications that use these features do not require any special client libraries to invoke these features. Moreover, the disclose cryptographic features (in particular the key storage) may be implemented without the use of a specialized cryptographic hardware, such as specialized processor, a hardware security module (HSM), or a trusted platform module (TPM), which are more costly and less scalable than a VMM-implemented solution. These and other benefits and features of the disclosed VMM system and described in further detail below, in connection with the figures.

FIG. 1 is a block diagram illustrating an example virtual machine monitor (VMM) configured to securely store cryptographic keys and perform cryptographic operations for guest virtual machines (VMs), according to some embodiments.

As shown, the figure depicts a computing system 100 that implements a virtual machine monitor or VMM 140, which is hosting a number of guest virtual machines (VMs) 110a, 110b, and 110c. The computing system 100 may be, for example, a physical virtualization host, which may be operated by a service provider of a virtualization service. As may be understood, a virtual machine in this context is an emulation of a computer system implemented by a physical computing system or host. In some embodiments, the guest VMs may implement guest operating systems (OSs), and a single VMM may host different guest VMs having different types of guest OSs.

In some embodiments, the VMM 140 may be a computer software or firmware that is configured to host virtual machines. As may be understood, the VMM may in some context be referred to as a "hypervisor," a "virtual machine monitor," or a "virtual machine manager." In some embodiments, the VMM 140 may be implemented as a bare-metal VMM, where VMM interacts directly with the host's hardware platform 160 to control the host's hardware components. In some embodiments, the VMM 140 may be implemented as a hosted VMM, where the VMM itself runs on top of an operating system of the physical host. As may be understood, the VMM 140 may provide the guest VMs 110 access to the underlying hardware 160, for example, the virtualization host's physical processor(s), memory, storage element(s), network interface(s), etc. In some embodiments, the VMM may expose the hardware platform 160 to the guest VMs 110 in a manner that the guest VMs 110 are unaware of the VMM 140 or the fact that they are virtualized machine instances. For example, the VMM 114 may implement functionality to allow the guest VMs 110 share the physical processor and physical memory of the hardware platform 160, and provide to the guest VMs the illusion that they are running on dedicated bare metal hardware. In some embodiments, the VMM 110 may implement device handling routines to handling device requests from the guest VMs 110, so as to make it appear to the VMs 110 that they are interfacing directly with physical devices. In this manner, software on the guest VMs 110 (e.g. the operating system and applications of the VMs) may operate in the same manner as (or with only minimal modifications to) software on non-virtualized machines.

As shown, the guest VMs (such as VM 110c) may execute one or more applications 122. The application 122 may be a user application running on top of a guest OS of the guest VM 110. As shown, the application 122 may run in the user space 120 of the VM, which is a memory space of the VM that is provided to user processes on the guest OS, while the guest OS may operate in a kernel space 130 of the VM, which is a memory space of the VM that is reserved for the guest OS. In some embodiments, the guest OS may provide various programmatic interfaces to the applications, such as device driver interfaces and system call interfaces, to allow the applications 120 to use the emulated hardware of the guest VM 110. As may be understood, the guest OS may provide a variety of system services to the applications 120 or user processes of the VM, such as process scheduling, memory management, and access to various hardware resources.

As shown, the application 122 in this example may be configured to invoke a cryptographic operation 124 via an invocation interface 132. As shown, invocation interface 132 may be implemented as an interface provided by the guest OS which, from the perspective of the application 122, can be used to execute the cryptographic operation in the guest OS, in the kernel space 130. In reality, as shown, the actual execution of the cryptographic operation 124 is performed within the underlying VMM 140.

Depending on the embodiment, the invocation interface 132 may take a variety of forms. In some embodiments, the invocation interface 132 may comprise a device driver, which may correspond to a device, from the perspective of the guest VM. In some embodiments, the device driver may be a paravirtualized device driver that is aware of the VMM 140. For example, the paravirtualized device driver may include code, calls, or interactions that is specifically directed to a module or component in the VMM 140. In some embodiments, the device driver may correspond to a virtual cryptographic device 156 implemented by the VMM. In some embodiments, the device driver may correspond to a storage device, such as a block-based device. In some embodiments, the device driver may correspond to a networking device, such as a switch, a router, or a network interface card (NIC). In some embodiments, the device driver may correspond to a virtual device implemented by the VMM, such as a virtual hardware security module (HSM) or a virtual trusted platform module (TPM) for the guest VM.

In some embodiments, the invocation interface 132 may implement one or more system calls to the guest OS, which may be exposed as one or more I/O control (e.g. ioctl) operations for a device, a special memory access function in a memory access interface, or some other type of system call. In some embodiments, the guest OS may provide a memory-mapped device corresponding to the virtualized cryptographic device 156, for example using the mmap system call available on POSIX-compliant systems. In some embodiments, the guest VM may implement a client library, application programming interface (API), or software development kit (SDK), that can be used by user space applications to call the invocation interface 132.

Depending on the embodiment, the cryptographic operation 124 may be an operation to apply a cryptographic key to a piece of input data and/or generate a result 126 from a cryptographic key. For example, the cryptographic operation may be an operation to sign or verify a message with the cryptographic key, or encrypt or decrypt a message with the cryptographic key. In some embodiments, the cryptographic operation 124 may not return a result 126. In some embodiments, the cryptographic key may be used to perform a cryptographic computation, such as to generate a pseudo-random value.

As shown, the VMM 140 implements a cryptographic key store 152 and a virtual cryptographic device 156. Depending on the embodiment, the cryptographic key store 152 may be implemented as a part of the virtual cryptographic device 156, or outside the virtual cryptographic device 156. In some embodiments, as discussed, the virtual cryptographic device 156 may be exposed via a device driver to the guest VM. In some embodiments, the virtual cryptographic device 156 may be a lightweight device that is configured to perform a particular cryptographic operation. In some embodiments, the virtual cryptographic device 156 may implement a number of cryptographic operations (e.g. operations 158a, 158b, 158c), which may be used by different applications or different guest VMs, and may correspond to different cryptographic keys 154a, 154b, 154c stored in the key store, as shown. As shown, in some cases, one key may be used for multiple cryptographic operations, and one cryptographic operation may use multiple keys. In some embodiments, the virtual cryptographic device 156 may implement a full suite of cryptographic operations, which may comply with an HSM security standard or a TPM standard. In some embodiments, the VMM may implement a configuration interface (such as a graphical user interface or GUI), to allow the keys in the key store 152 or the operations in the cryptographic device 156 to be augmented, removed, or otherwise modified by an administrator or control plane of the virtualization host.

As shown, both the key store 152 and the virtual cryptographic device 156 in this example are stored and operated in a VMM memory space 150. The VMM memory space 150 is a portion of the virtualization host's system memory. The VMM memory space 150 is accessible to the VMM 140, but inaccessible to the guest VMs 110. For example, in some embodiments, the VMM 140 may be configured to provide regions or pages of memory to individual guest VMs 110, to emulate physical memory to the guest OSs in the VMs. In some embodiments, the VMM may allocate memory pages in its own memory space to the individual VMs. However, the VMM 140 may reserve some this memory (e.g. VMM memory space 150) for its own use, which cannot be accessed by or even be seen by the guest VMs 110.

As shown, the key store 152 and virtual cryptographic device 156 are implemented in this VMM memory space 150 of the VMM 140, so that the guest VM 110 can never obtain the cryptographic keys 154 it their respective memory spaces (either kernel space 130 or user space 120). For example, even though the guest VM 110c can invoke a cryptographic operation, the operation itself is actually executed in VMM memory space 150. Thus, the cryptographic keys 154 are never downloaded to or handled by the guest VMs, and cannot be exfiltrated through the guest VM environment. As may be understood, the restriction of the key and the cryptographic operation to the VMM memory space improves the overall security of the system. Additionally, the key store 152 and virtual cryptographic device 156 may be implemented using only the existing memory of the virtualization host, without using additional specialized hardware. As may be understood, specialized security hardware such as HSMs and TPMs are expensive and cumbersome, and do not provide sufficiently scalability and configurability needed in a dynamic virtualization environment.

Figure 2:
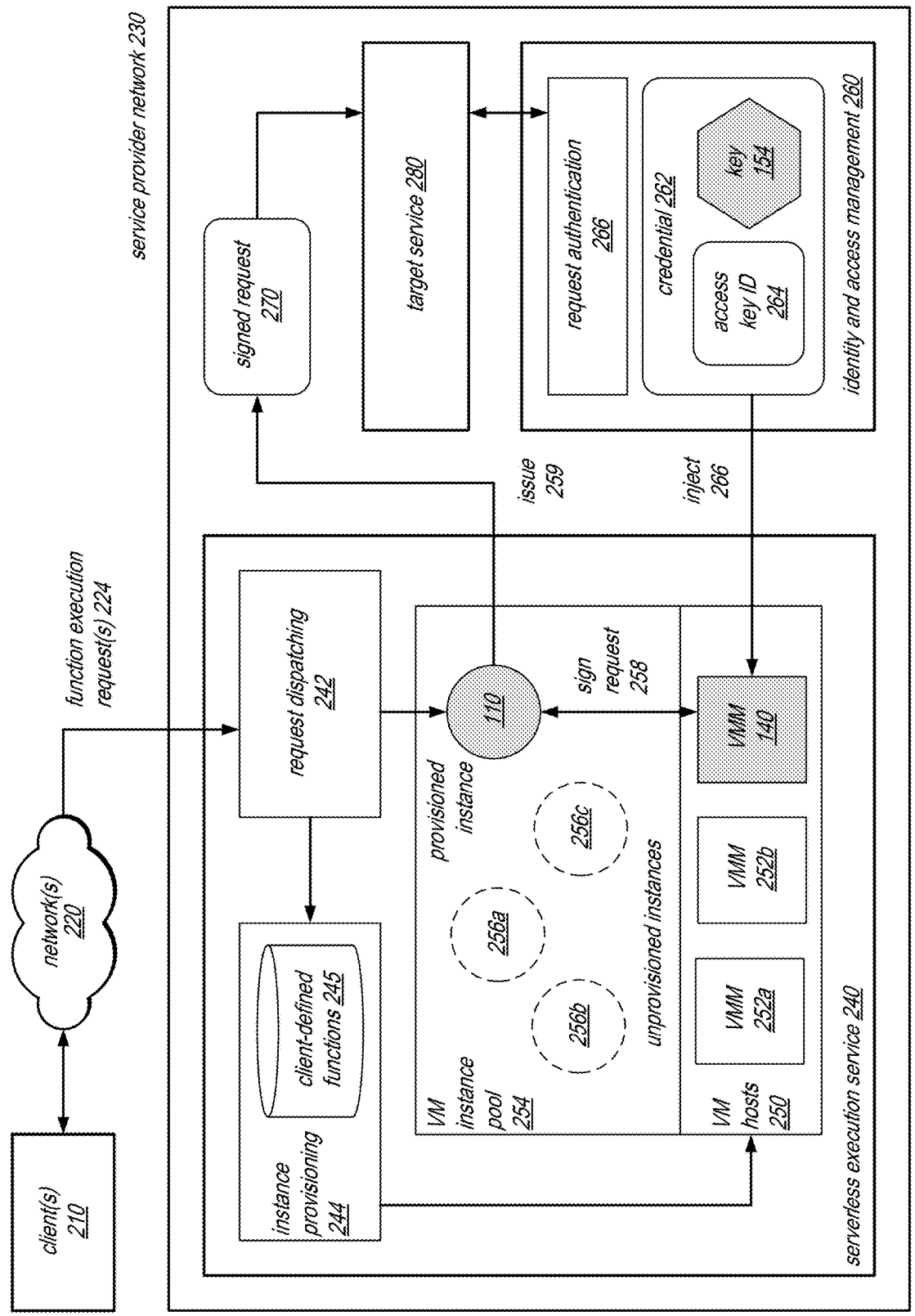
FIG. 2 is a block diagram illustrating an example implementation of a serverless execution service that uses VMMs to securely store cryptographic keys and perform cryptographic operations for guest VMs, according to some embodiments.

FIG. 2 is a block diagram illustrating an example implementation of a serverless execution service that uses VMMs to securely store cryptographic keys and perform cryptographic operations for guest VMs, according to some embodiments.

As shown, the figure depicts a cloud-based service provider network 230 that can be accessed over one or more networks 220 by various clients 210. In some embodiments, the network 220 may be a public network such as the Internet. In some embodiments, the client(s) 210 may lease different amounts of computing resources for one or more services provided by the service provider network 230, such as a serverless execution service 240, as shown. In some embodiments, the service provider network 230 may operate a large number of computing stems that may be provisioned and de-provisioned on demand to support the operations of its services. The services may be implemented using one or more service endpoints configured to receive and process services requests. The services may be implemented using hardware and/or software to properly receive and process HTTP-based web services requests directed to their endpoints. In one embodiment, the services may be implemented as a server system configured to receive web services requests from clients and to forward them to various components that collectively implement a data storage system, serverless execution system, object storage system, etc., for processing. In other embodiments, the services may be configured as a number of distinct systems (e.g., in a cluster topology) implementing load balancing and other request management features configured to dynamically manage large-scale web services request processing loads.

In various embodiments, the components in the services may be implemented directly within computer hardware, as instructions directly or indirectly executable by computer hardware (e.g., a microprocessor or computer system), or using a combination of these techniques. For example, the components of the serverless execution service 240 may be implemented by a distributed system including a number of computing nodes. In some embodiments, the functionality of a given service system component may be implemented by a particular computing node or may be distributed across several computing nodes. In some embodiments, a given computing node may implement the functionality of more than one service system component.

In some embodiments, the APIs provided by the services may support request and response parameters encoded in one or more industry-standard or proprietary data exchange formats, in different embodiments. For example, in various embodiments, requests and responses may adhere to a human-readable (e.g., text-based) data interchange standard, (e.g., JavaScript Object Notation, or JSON), or may be represented using a binary encoding (which, in some cases, may be more compact than a text-based representation). In various embodiments, the system may supply default values (e.g., system-wide, user-specific, or account-specific default values) for one or more of the input parameters of the APIs described herein.

The client(s) 210 for the service provider network 230 may encompass any type of client configurable to submit service requests to a provider network. In some embodiments, a client 230 may include a suitable version of a web browser or a plug-in module for a web browser, or other type of code module configured to execute as an extension to or within an execution environment to provide database or data storage service clients (e.g., client applications, users, and/or subscribers) access to the services provided by provider network. Alternatively, a client 230 may encompass an application such as a database application, media application, office application or any other application that may make use of persistent storage resources. In some embodiments, an application may include sufficient protocol support (e.g., for a suitable version of Hypertext Transfer Protocol (HTTP)) for generating and processing web services requests without necessarily implementing full browser support for all types of web-based data. A client 230 may be an application configured to interact directly with the services. In some embodiments, a client 230 may be configured to generate web service requests according to a Representational State Transfer (REST)-style web services architecture, a document- or message-based web services architecture, or another suitable web services architecture.

In some embodiments, the serverless execution service 240 may automatically provision compute nodes (e.g. virtual machine instances 256a-c and 110 that execute on virtualization hosts 250) to perform function execution requests 224. In some embodiments, the serverless execution service may maintain a pool 254 of VM instances to perform these function execution requests 224, but the instances or nodes in the pool are not dedicated or leased to any particular client. Rather, they are provisioned only to perform a particular incoming request, and released back to the pool after the function is executed.

As shown, in some embodiments, the serverless execution service 240 may include a request dispatching module 242, an instance provisioning module 244, and a VM instance pool 254. These modules and components may be implemented using a combination of software and hardware modules or components. In some embodiments, multiple instances of these modules may be implemented on a cluster of compute nodes, which may be virtual machine instances, in some embodiments. In some embodiments, instances of VMs in the pool 254 may be dynamically provisioned or de-provisioned on demand, in response to requests (e.g. request 224) or specified triggering events. Accordingly, the serverless execution service 240 may be used to implement an execution platform that is dynamically scalable and capable of serving a large number of different clients.

In some embodiments of the serverless execution service 240, the request dispatcher 242 may be configured to receive function execution requests 224. In some embodiments, the request dispatcher 242 may also receive events generated by other computing systems. In response to these requests or events, one or more instances of client-defined functions 245 may be launched to handle the requests or events. In some embodiment, each request or event may be handled via one invocation of a function. The serverless execution service 240 may be configured to receive many different types of function execution requests 224.

In some embodiments, the pool 254 may be implemented using a number of virtual machine instances. In virtual machine instances may be hosted on a set of VM hosts 250, which may be physical computer systems. The VM hosts 250 may each implement a virtual machine monitor or VMM. In some embodiments, the VMMs may be the VMM 140 of FIG. 1, and some of the VM instances in the pool 254 may be guest VM 110, as discussed in connection with FIG. 1. The VM instances in the pool 254 may be dynamically provisioned and de-provisioned in response to received requests 224, and based on runtime conditions or loads of the service 240.

In some embodiments, the VM instance pool 254 may be used to implement an execution environment for the serverless execution service 240. In some embodiments, the nodes in the instance pool 254 may be configured to execute instances of functions requested. The client-defined function 245 may be previous provided by one or more clients, are they are executable within the serverless execution service 240. For example, in some embodiments, the function may be a Java module, and the nodes in the container pool 254 may be used to execute the Java module.

In some embodiments, the serverless execution service 240 may maintain a VM instance for a time period after a request has been handled, so that the node may be reused for a subsequent request of the same type. In this manner, the serverless execution service 240 avoids the initializing costs for a new request. In some embodiments, unprovisioned VM instance may be held in a frozen state (e.g., nodes 256a, 256b, 256c), for example, by suspending or pausing processes or threads associated with the instance. In some embodiments, in the frozen state, some resources held by the node (e.g., database connections, etc.) may be maintained, but switched to a low-priority or sleep mode. When a new request is received by the dispatcher 242, a frozen container and/or function may be quickly thawed back into an active instance (e.g., active instance 110) to handle the new request. In some embodiments, used VM instances may be maintained in the frozen state for a configurable amount of time (e.g., one hour), before the computing resources are released.

As shown, in some embodiments, an instance provisioning module 244 may be implemented in the service 240. The provisioning module 244 may be configured to load, from a function repository 245, instances of functions into VM instances of the instance pool 254. As discussed, the functions may be client-defined functions supplied by a client. A function may be defined to perform certain client-specific operations in response to particular requests or events. In some embodiments, the provisioning module 244 may provision VM instances in the pool 254 to execute individual client-defined functions, to handle the received requests 224. In some embodiments, the provisioning module 244 may also perform an auto-scaling function, so that a group of VM instances or functions are maintained in the pool 254, and the size of the group may grow or shrink based on the current load of the system, the rate of incoming requests, or other scaling factors. In some embodiments, the provisioning module 245 may also be responsible for the freezing and thawing of VM instances in accordance with a policy of the service.

As shown, in some embodiments, a provisioned (or active) instance 110 in the service 240 may issue 259 requests to other services in the service provider network 230, such as the target service 280 in this example. In some embodiments, some requests sent to services in the service provider network must be signed with a credential, which identifies the issuer of the request. For example, a credential may be associated with a particular VM instance, a particular application, or a particular client. As shown, the service provider network 230 may implement an identity and access management (IAM) system 260, which stores the credentials (e.g. credential 262) and its access policies or granted privileges. In some embodiments, a credential 262 may include an access key ID, which may be a unique identifier for the credential, and a key 154, which may be used to perform cryptographic operations such as signing the messages or requests. In some embodiments, the key 154 may be a symmetric key so that a single key is used to sign and verify a message. In some embodiments, the key 154 may include a pair of asymmetric keys so that the signing key (e.g. a private key) is different from the verification key (e.g. a public key). In some embodiments, the key 154 associated with the credential 262 may be automatically rotated by the IAM system 260.

As shown, in some embodiments, the credential 262 or key 154 for the issuer of a particular request 259 may be injected 266 ahead of time into a VMM 140. In some embodiments, this injection may occur via a configuration or key injection interface exposed by the VMM 140. In some embodiments, the injection may occur as a VMM is selected for execution of a particular request, or when the active VM instance 110 is provisioned to execute the function. In some embodiments, VMMs corresponding to frozen VM instances 256 may retain the signing keys used by the frozen VM instances. In some embodiments, the VMM 140 may not obtain the signing key from the IAM system 260, but may simply generate a signing key for each individual VM instance, or each individual function execution request 224.

As shown, once the VMM 140 is injected with the singing key 154, the active VM instance 110 may use the VMM 140 to sign requests that will be issued to the target service 280. The signing of the request 258 may be performed via a cryptographic operation as discussed in connection with FIG. 1. For example, the active VM instance 110 may include an invocation interface for the signing operation, which allows the request to be signed without the active VM instance ever obtaining the signing key 154. In some embodiments, an application running on the active VM instance 110 may provide the unsigned request to the VMM via the invocation interface, and the VMM may return a result data that represents the signed request 270. The signed request can then be issued 259 to the target service 280, which in turn may verify the request via the IAM service 260. In some embodiments, the target service 280 may verify the request without using the IAM system 260. For example, in some embodiments, the target service 280 may have a copy of a public key that can be used to verify the request. In some embodiments, the verifying key may be stored by a VMM hosting a virtual machine that acts as an endpoint for the target service, in the manner discussed in connection with FIG. 1.

As may be understood, the storing of the cryptographic key 154 within the VMM 140 is particularly advantageous in this context, because in this sort of serverless execution service 240, the VM instances 256a, 256b, 256c, and 110 may be reused for different function execution requests and across different clients. Accordingly, the risk of exfiltration of secrets (e.g. information about cryptographic keys of a client) from the VM environment is more acute. Moreover, in some embodiments, the VM instances 256a, 256b, 256c, and 110 may be configured with a large number of instance modules, libraries, and access privileges, making these ad hoc instances extremely powerful. Restricting these instances from gaining the secret cryptographic keys of a client provides an additional layer of protection against the possible misuse of these instances to cause catastrophic damage or breach to the client.

Figure 3A:
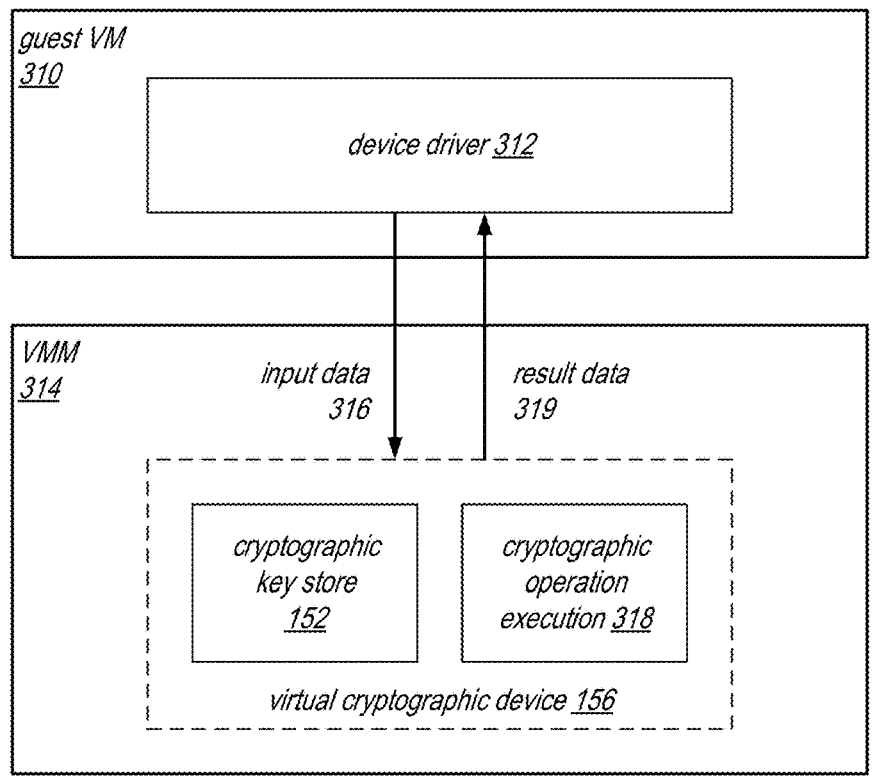
FIGS. 3A to 3C illustrate examples VMMs that implement virtual cryptographic devices to securely store cryptographic keys and perform cryptographic operations for guest VMs, according to some embodiments.
Figure 3B:
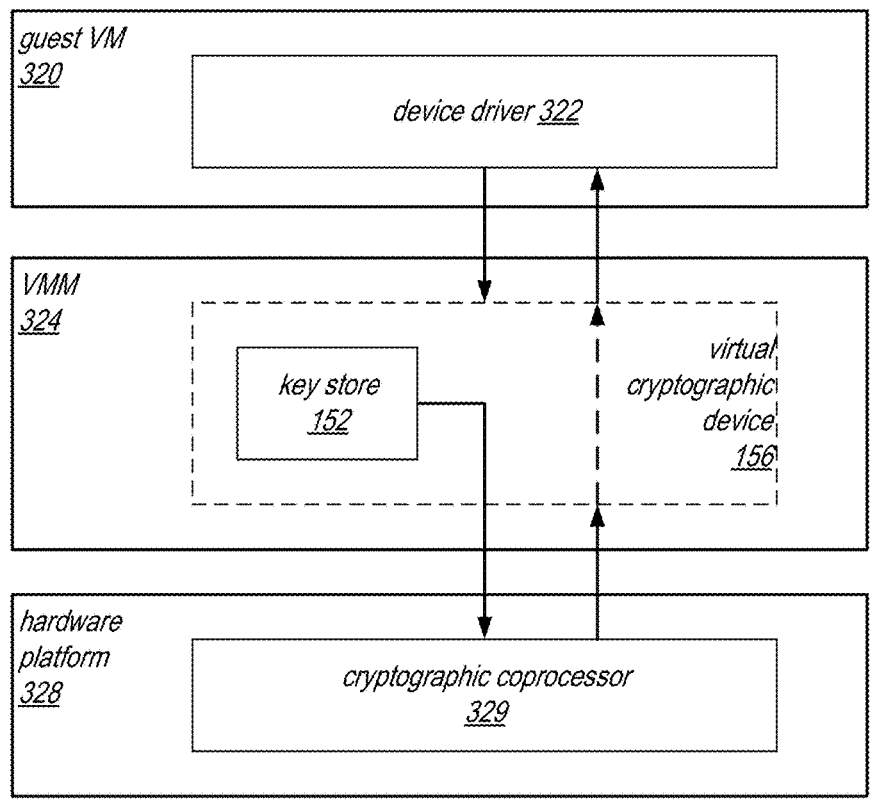
Figure 3C:
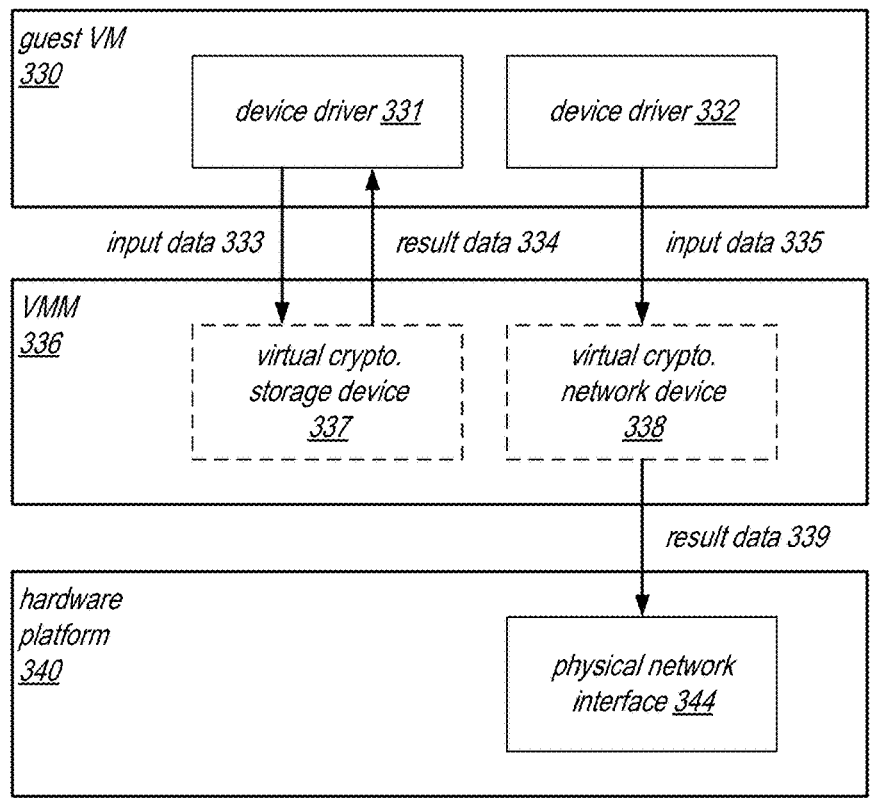

FIGS. 3A to 3C illustrate examples VMMs that implement virtual cryptographic devices to securely store cryptographic keys and perform cryptographic operations for guest VMs, according to some embodiments.

FIG. 3A depicts a VMM 314, which may be an embodiment of the VMM 140 as discussed in connection with FIG. 1. As shown, in this example, the VMM 314 implements a virtual cryptographic device 156, which may be exposed as a device driver 312 to the guest VM 310. In some embodiments, the device driver may simply provide a standard set of device control calls for the virtual cryptographic device 156. In some embodiments, the device driver may define certain additional device-specific system calls (e.g. ioctl calls) for the device 156. As discussed, in some embodiments, the device 156 may be a lightweight device that performs one or more cryptographic operations, using a cryptographic operation execution module 318 and corresponding cryptographic keys from the key store 152. In some embodiments, the device 156 may operate completely in a memory space of the VMM 314, which is accessible to the VMM but not accessible to any guest VMs hosted by the VMM, such as guest VM 310. In some embodiments, the device 156 may be implemented as a sidecar VM (e.g., an emulated device) running on top of the VMM 314, where the sidecar VM's memory (e.g. for storing the key store 152 or the execution module 318) cannot be accessed directly from the other guest VMs (e.g. VM 310) hosted by the VMM. As discussed, in some embodiments, the device 156 may be exposed to the guest VM 310 as a standard type of device, such as a storage device or a networking device, which may be understood to implement a special semantic or protocol to allow the guest VM to invoke the cryptographic operation. In some embodiments, the device driver 312 may be implemented as a paravirtualized driver, which is aware of the VMM. For example, in some embodiments, a paravirtualized device driver may be programmed with calls to interact with specific components or modules in the VMM 314.

As shown, in some embodiments, the virtual cryptographic device 156 may be implemented to accept an input data 316 from the device driver and provide a result data 319 via the device driver. For example, the input data 316 may be received from the guest VM via a device interrupt trapped by the guest OS on the guest VM, and the result data 319 may be provided back to the guest VM as a result of the interrupt handling routine in the guest OS. For example, in some embodiments, the input data 316 may be provided via a write to a special storage device (e.g. a write to a special block of the storage device), and the result data 319 may be provided via the same special block or a different special block on the storage device. As another example, in some embodiments, the virtual cryptographic device 156 may be implemented as a special network switch, which accepts the input data 316 via one switch interface, and returns the result data 319 via another switch interface.

FIG. 3B depicts a VMM 324, which may be an embodiment of the VMM 140 as discussed in connection with FIG. 1. In this embodiment, as shown, the VMM 324 implements a virtual cryptographic device 156 that relies on a hardware cryptographic coprocessor 329. For example, the hardware cryptographic coprocessor 329 may be implemented as part of the hardware platform 328 of the virtualization host, which may be the hardware platform 160 as discussed in connection with FIG. 1. Depending on the embodiments, the cryptographic coprocessor may be implemented in a variety of forms. In some embodiments, the cryptographic coprocessor may be implemented as removable dongles or smartcards. In some embodiments, the cryptographic coprocessor my be a trusted platform module (TPM) attached to the virtualization host. In some embodiments, the cryptographic coprocessor may be implemented as a removable hardware security module (HSM). In some embodiments, the cryptographic coprocessor may be implemented as part of the central processing unit of the virtualization host.

As shown in this example, the cryptographic coprocessor 329 is not used to store the key store 152 of the VMM 324. However, the VMM 324 may use the cryptographic coprocessor to perform the cryptographic operation using a cryptographic key from the key store 152, and the provide the result of the operation back to the device driver 322 of the guest VM 320, via the virtual cryptographic device 156. In some embodiments, the execution of the cryptographic operation may take place entirely in the memory space of the cryptographic coprocessor 329, and that memory space cannot be accessed by any guest VM hosted by the VMM 324 (or at least guest VM 320). However, the cryptographic keys (e.g. key store 152) are still stored within the VMM memory space, as shown. In this manner, the storage of these keys can be more easily configurable and more scalable to accommodate a large number of guest virtual machines.

FIG. 3C depicts a VMM 336, which may be an embodiment of the VMM 140 as discussed in connection with FIG. 1. In this embodiment, as shown, there are two device drivers (331 and 332) for two different virtual cryptographic devices (337 and 338). In some embodiments, the VMM 336 may implement multiple ways that different cryptographic operations can be invoked from the guest VM 330. In some embodiments, multiple virtual cryptographic devices in the VMM 336 may shared a common key store, such as key store 152. In this example, as shown, device driver 331 exposes a virtual cryptographic storage device 337. As discussed, in some embodiments, such a device may be configured to accept input data 333 via a write request to the device, and then return result data 334 via a read request to the device. The storage device 337 itself would perform the cryptographic operation either with the write request or the read request. For example, in some embodiments, the storage device 337 may automatically encrypt or decrypt data written to a particular area of the special storage device 337.

As shown, device driver 332 exposes a virtual cryptographic network device 338, which in this case corresponds to an underlying physical network interface 344 in the hardware platform 340 of the virtualization host. For example, the virtual cryptographic network device may implement a virtual network interface card (NIC), which may accept input data 335 (e.g. packets to be sent over the network). In some embodiments, the virtual NIC may automatically sign outgoing packets using a cryptographic key, before passing the signed packet to the physical network interface 344. In some embodiments, the virtual NIC may not return the result of the cryptographic operation (e.g. the signed packet) back to the guest VM 330, and may instead only provide an acknowledgement of the transmission. In some embodiments, the virtual NIC may be configured to also perform a cryptographic operation on an incoming packet, for example, to authenticate or verify the signer of the incoming packet. In this manner, a client of a virtualization service may implement a cluster of guest VMs or applications that communicate using a client-specific signing protocol.

Figure 3D:
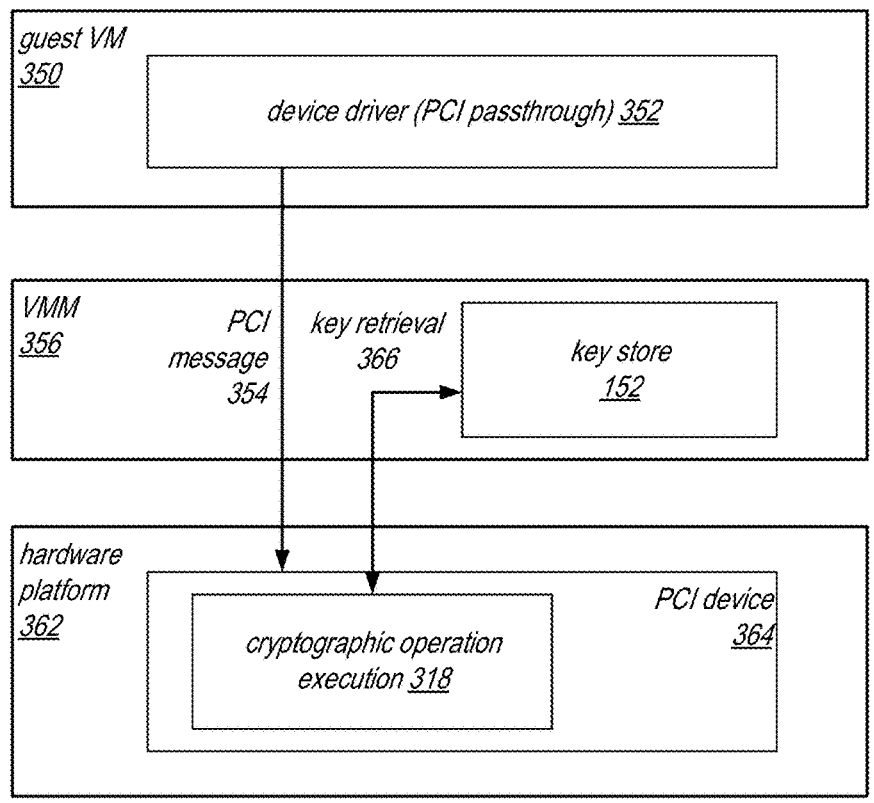
FIG. 3D illustrates an example VMM that implements a PCI passthrough device mechanism to securely store cryptographic keys and perform cryptographic operations for guest VMs, according to some embodiments.

FIG. 3D illustrates an example VMM that implements a PCI passthrough device mechanism to securely store cryptographic keys and perform cryptographic operations for guest VMs, according to some embodiments.

As shown, the figure depicts a guest VM 350 hosted on a VMM 356, which may be an embodiment of the VMM 140 as discussed in connection with FIG. 1. As shown in this example, the guest VM 350 implements a device driver 352 that is a PCI passthrough device driver. In this type of device driver, device requests are passed directed to an underlying PCI device (e.g. PCI device 364 of the hardware platform 362). Thus, in PCI passthrough, the VMM 356 is providing the guest VM an interface to directly communicate with the target PCI device 364. In some embodiments, the underlying device is provided in an isolated fashion, for the exclusive use of one guest VM. In some embodiments, PCI passthrough device drivers may enable guest VMs to achieve better performance when using the target device.

As shown, in this example, the guest VM 350 may send PCI messages 354 directly to the PCI device 364. As shown, the PCI device 364 in this example may implement the cryptographic operation execution 318 to perform the cryptographic operation in a secure environment that is not accessible to the guest VM. In some embodiments, the PCI device 364 may be a specialized hardware device such as a specialized storage device, network interface card, or dongle that is equipped to perform cryptographic operations (e.g. encryption or signing). In some embodiments, the specialized hardware device 364 may be configurable to retrieve 366 cryptographic keys from external key stores, such as key store 152 in the VMM 356. For example, in some embodiments, the virtualization host or VMM 356 may expose a direct memory access (DMA) interface to the PCI device 364, to allow the PCI device to access a particular area of the virtualization host's main memory (e.g., the VMM memory space that is storing the key store 152). Accordingly, the PCI device 364 may retrieve the cryptographic key for the cryptographic operation from the VMM's key store 152. While the operation itself is performed by the PCI device 364, the cryptographic key is still maintained and managed by the VMM 356.

Figure 3E:
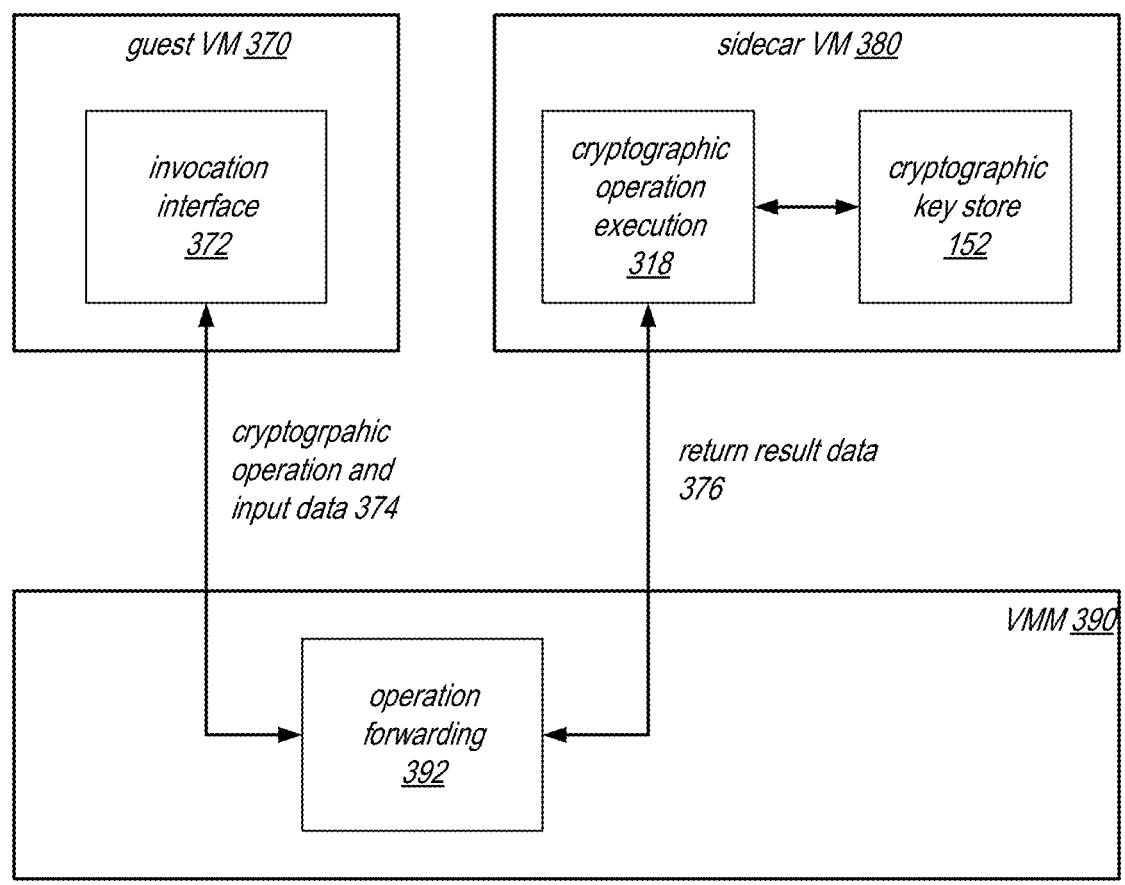
FIG. 3E illustrates an example VMM that implements a sidecar VM to securely store cryptographic keys and perform cryptographic operations for guest VMs, according to some embodiments.

FIG. 3E illustrates an example VMM that implements a sidecar VM to securely store cryptographic keys and perform cryptographic operations for guest VMs, according to some embodiments.

As shown in this example, the VMM 390 hosts both a guest VM 370 and a sidecar VM 380. In some embodiments, the sidecar VM 380 may be an emulated device or another virtual machine instance, which may be specially configured to implement the cryptographic key store 152 and the cryptographic operation execution module 318. In some embodiments, the sidecar VM 380 may only implement one of the cryptographic operation execution module 318 or the key store 152, and the other component may be implemented in the a memory space of the VMM 390 that is not accessible to any guest VMs hosted on the VMM. In some embodiments, the sidecar VM 380 may be a VM instance or emulated device whose lifespan coincides with the VMM 390. In some embodiments, the sidecar VM 380 may be launched or terminated at different times during the life of the VMM 390, for example, to coincide with the life of the guest VM 370.

As shown, the guest VM 370 may implement an invocation interface 372 into invoke 374 the cryptographic operation and provide any input data for the cryptographic operation. In this example, the VMM 390 may implement an operation forwarding module 392 that forwards the invocation request to the sidecar VM 380. In turn, the sidecar VM may execute the cryptographic operation using the correct cryptographic key and return 376 the result of the operation back to the guest VM 370. In some embodiments, the returning of the result data may not involve the operation forwarding module 392. Advantageously, in this example, the cryptographic key store 152 is maintained in a memory space of the sidecar VM 380, and not directly accessible to the guest VM 370. Moreover, the execution of the cryptographic operation is performed in the memory space of the sidecar VM, which is not accessible to the guest VM 370. Accordingly, the cryptographic key is never held in the memory of the guest VM 370.

Depending on the embodiment, the sidecar VM 380 may be implemented in a variety of forms. In some embodiments, the sidecar VM 380 may be implemented as a virtual device, for example, the virtual cryptographic device 156 discussed previously, and the invocation interface 372 may be implemented as a device driver or some other system call interface. In some embodiments, the sidecar VM 380 may be implemented as another hosted VM on the VMM, which may be exposed to the guest VM 370 as another network endpoint. In some embodiments, invocation request 374 may be implemented as a network message to the sidecar VM 380, and the VMM 390 may implement the operation forwarding module 392 as a network device, such as a virtual switch or router. In some embodiments, the invocation interface 372 may implement a special network protocol to invoke the cryptographic operation.

In some embodiments, the VMM 390 may host one sidecar VM instance 380 for multiple or all guest VMs 370 on the VMM. In some embodiments, each guest VM instance 370 may be associated with a different cryptographic key in the key store 152. In some embodiments, the sidecar VM 350 may implement a key selection module to select the correct key to use for an incoming cryptographic operation invocation, based on the identity of the guest VM or a container or application that issued the invocation request. In some embodiments, the VMM 390 (e.g. operation forwarding module 392) may provide the guest VM identifier or an identifier for the key to use. In some embodiments, the guest VM 370 itself may explicitly indicate the key to use for the cryptographic operation.

Figure 4A:
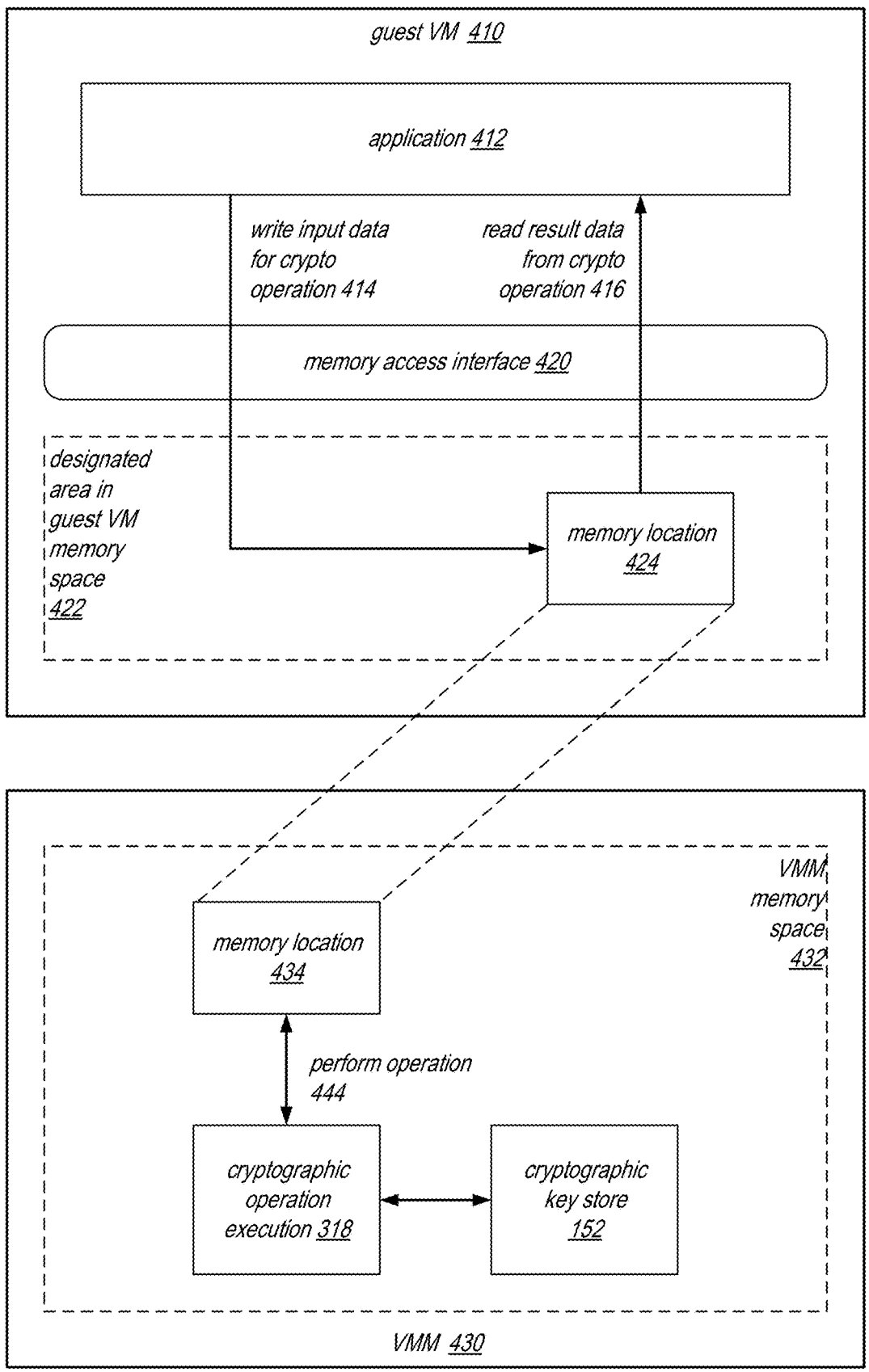
FIG. 4A illustrates an example VMM that implements a memory access protocol that allows a guest VM to perform cryptographic operations using cryptographic keys stored with the VMM, according to some embodiments.

FIG. 4A illustrates an example VMM that implements a memory access protocol that allows a guest VM to perform cryptographic operations using cryptographic keys stored with the VMM, according to some embodiments.

As shown, the figure depicts a guest VM 410 hosted on a VMM 430, which may be an embodiment of the VMM 140 as discussed in connection with FIG. 1. As shown, guest VM 410 implements a memory access interface 420 to access a memory space of the guest VM. In this example, the memory access interface 420 serves as the invocation interface 132 for invoking a cryptographic operation. As shown, application 412 invokes the cryptographic operation by writing 414 an input data for the cryptographic operation to an area of the guest VM's memory, for example, a particular designated area 422 in the guest VM memory space that is understood to be associated with the cryptographic operation. For example, the write operation may write a particular memory location or address 424 that is within the designated area of guest VM memory space. As a result of the write, the guest OS may invoke the cryptographic operation to be performed in the VMM 430, and provide the result back to the application 412 via the memory access interface. For example, the guest OS may provide the result of the cryptographic operation at the same memory location or address 424 in the guest VM's memory space, so that it can be read 416 by the application 412. In some embodiments, the result of the cryptographic operation may be provided back in a different memory location or address.

In some embodiments, the memory access interface 420 may be augmented with one or more special system calls to perform the cryptographic operation. For example, the guest OS may implement a system call that reads or writes the guest memory, but also perform the cryptographic operation. In some embodiments, the memory access interface 420 may be the standard OS memory access interface, which is not modified to implement the cryptographic operation. For example, in some embodiments, it may simply be understood by the application that a write to a particular designated area of the guest VM memory will invoke the cryptographic operation.

As shown, the memory location or address 424 in the guest VM memory space may correspond to a memory location or address 434 in the VMM memory space 432. In some embodiments, the VMM 430 may provide portions or pages of its own memory to the guest VM(s), so that the pages appear to the guest OS as physical memory pages provided by the hardware. In some embodiments, part of the VMM's function is to provide memory management to provide memory pages on demand to its hosted guest VMs. As shown, to perform the cryptographic operation, in some embodiments, the VMM 430 may detect that a memory read or write in the guest VM invokes the cryptographic operations, and in response, perform the operation 444 on the data in its own memory location 434. In this example, the cryptographic operation may be performed may be performed by reading the memory location 434, operating on the data in the memory location 434 (without using any memories that are visible to the guest VM), and writing the result of the operation back to memory location 434. As shown, the operation may be performed using the cryptographic operation execution module 318, as discussed previously, and using one or more cryptographic keys from the key store 152, as discussed previously. As discussed, the execution of the cryptographic operation may be performed in a memory space of the VMM 430, or some other memory space, that is not accessible to the VM 410. As a result, from the VM's perspective, the data written or read from its own memory is "magically" transformed via the cryptographic operation, while the VM itself never obtains or handles the cryptographic key to perform the operation.

Figure 4B:
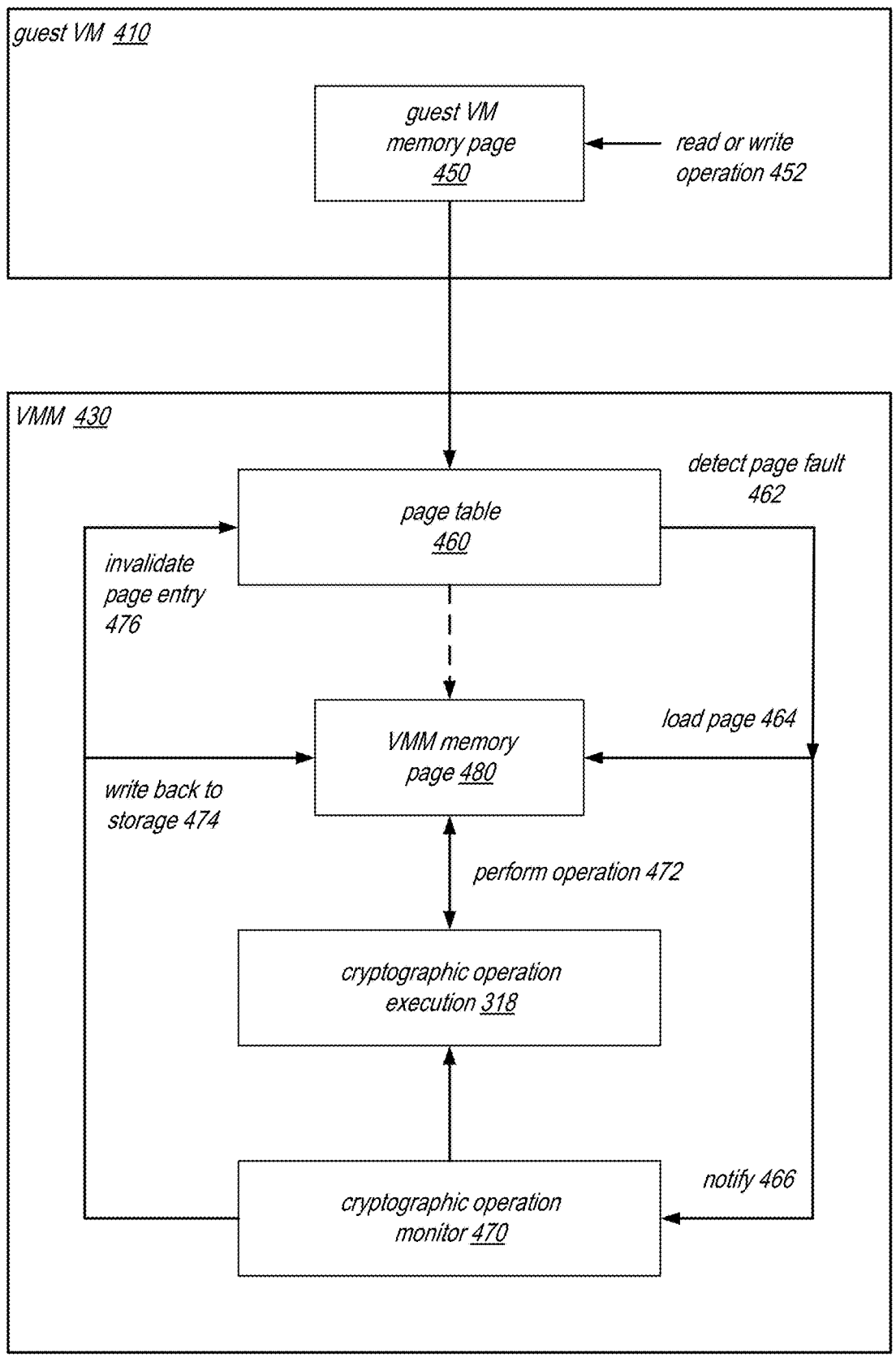
FIG. 4B illustrates an example VMM that performs cryptographic operations on behalf of a guest VM in response to a detect page fault, according to some embodiments.

FIG. 4B illustrates an example VMM that performs cryptographic operations on behalf of a guest VM in response to a detect page fault, according to some embodiments. As shown, the depicted VMM 430 in the figure may be an embodiment of the VMM 430 of the previous FIG. 4A.

As shown, in this example, the VMM 430 may detect the invocation of the cryptographic operation via a page fault. In some embodiments, as discussed, the cryptographic operation may be invoked via a read or a write operation 452 to a memory location or memory page 450 in the guest VM's memory space.

In some embodiments, the VMM 430 may only maintain a subset of memory pages that are currently needed by the memories of its guest VMs. For example, the VMM 430 may maintains a set of memory pages in its runtime memory that are most recently used or most frequently used by its VMs, while relegating the other memory pages to slower memory or storage. In this manner, the VMM 430 may implement a "virtual" memory that is much larger than its own memory space.

In some embodiments, the VMM 430 may implement a page table 460, which may implement a mapping from the page addresses of the guest VM(s) to its own page addresses (in the VMM address space). For example, the page table 460 may be populated as memory pages are allocated for guest VMs in response to page requests. In some embodiments, the page table 460 may also include per-page metadata, for example, that indicate whether a particular page is currently in the runtime memory of the VMM. If not, a page fault may be detected 462, and the requested page may be loaded into the runtime memory of the VMM and provided to the guest VM. In addition, the page table 460 may be updated to indicate that the loaded page is currently in VMM memory.

In some embodiments, the VMM 430 may use this page fault mechanism to detect the invocation of the cryptographic operation. For example, in some embodiments, the VMM memory manager may be configured to always cause a page fault when a particular range of memory pages are accessed. Accordingly, any access to a page in that range will result in a page fault, which causes the VMM to trap into a handler routine to handle the page fault condition (e.g., to load up the requested page 464). The page fault may be monitored by another component within the VMM 430, for example, the cryptographic operation monitor 470, as shown. When the monitor 470 is notified 466 of the page fault, it can then cause the cryptographic operation execution module 318 to execute the cryptographic operation 472. In this example, the input data for the cryptographic operation resides in the VMM memory page 480 corresponding to the guest VM memory page 450 being used for the cryptographic operation, and the result data for the cryptographic operation is written back to the same memory page 480. Accordingly, when control returns back to the guest VM, the result of the cryptographic operation will be visible in guest VM memory page 450.

As shown, in some embodiments, after the cryptographic operation is performed, the page table 450 may be updated 476 to invalidate the page entry for the memory page 480 that was loaded. In this manner, a next access to that memory page will again result in a page fault. In some embodiments, the VMM's memory manager may simply be configured to always keep that page in an invalid or unloaded state. In some embodiments, depending on the semantics of the page table, the VMM memory page 480 that was modified with the cryptographic operation may also be flushed back to storage (or where the page was loaded from). In some embodiments, the write back operation may be performed lazily or asynchronously from the page fault handling routine.

Figure 5:
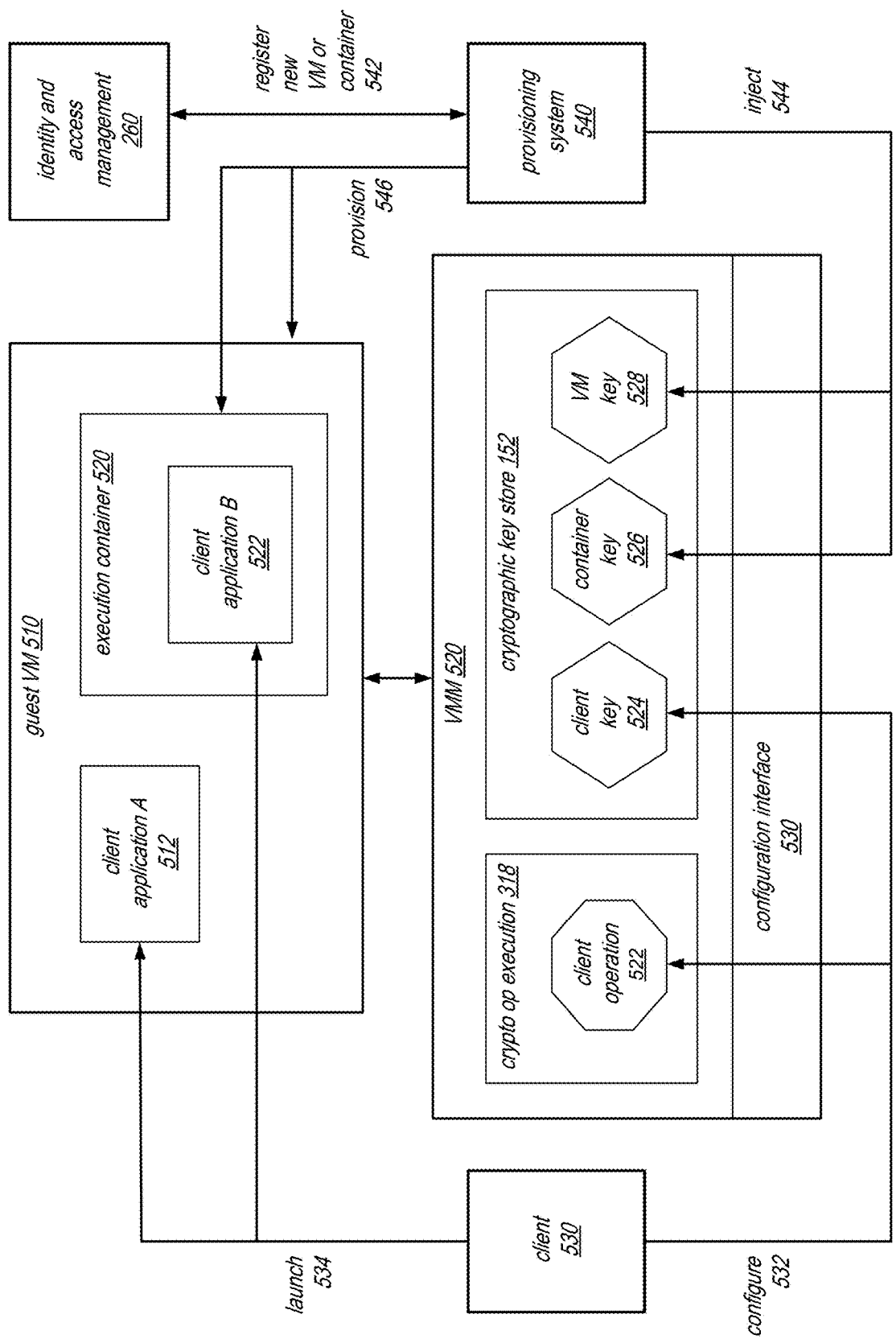
FIG. 5 illustrates an example configuration interface for a VMM to receive cryptographic keys and cryptographic operations for guest VMMs, according to some embodiments.

FIG. 5 illustrates an example configuration interface for a VMM to receive cryptographic keys and cryptographic operations for guest VMMs, according to some embodiments.

As shown, the figure depicts a guest VM 510 hosted on a VMM 520, which may be an embodiment of the VMM 140 as discussed in connection with FIG. 1. In this example, the VMM 520 maintains a key store 152 that stores a number of different cryptographic keys, including a client key 524, a container key 526, and a VM key 528. In this example, the client key is a cryptographic key provided by a client 530, which may be used a particular client-specified cryptographic operation 522. The VMM 520 may provide a configuration interface 530, which allows the cryptographic execution module 318 (or virtual cryptographic device 516) to be configured by other administrators or systems, such as client 530 or provisioning system 540. Thus, for example, the client 530 may implement an application A 512 that invokes the client cryptographic operation 522 and, prior to the launch 534 of the application A 512 on the VM, inject both the cryptographic operation 522 and the client key needed by the cryptographic operation 524 into the VMM 530. In this manner, the VMM 530 may be preconfigured to perform the cryptographic operation 522 in response to invocations from application A 512. In some embodiments, the invocation interface used by application A may allow the application to specify a particular cryptographic operation to perform, and/or a particular cryptographic key to use.

As shown, in some embodiments, the VMM 530 may be injected with other types of cryptographic keys via the configuration interface 530, including container keys 526 and VM keys 528. In some embodiments, the container key 526 may be associated with an execution container 520 running on the guest VM 510. In some embodiments, these execution containers 520 may be provided by the virtualization service provider to execution a particular type of client application, such as application B 522 from the client. In some embodiments, the execution container may be uniquely associated with or identified by the container key 526. For example, the container key 526 may be used to sign or encrypt all outgoing messages from the execution container 520. Another type of cryptographic key that may be injected is a VM key 528, which may be associated with the guest VM 510 itself. In some embodiments, the VM key 528 may be uniquely associated with or identify the guest VM 510. For example, the VM key 528 may be used to sign or encrypt all outgoing communications issued by the guest VM 510.

In some embodiments, as shown, the cryptographic keys (or additional cryptographic operations) may be injected 544 into the VMM 520 by one or more systems in the virtualization service provider network, such as a provisioning system 540. In some embodiments, the provisioning system 540 may be tasked with dynamically provisioning 546 different VM instances on virtualization hosts, or execution containers on VM instances. Such dynamic provisioning may occur based on the virtualization service's various policies specified in its control plane. For example, in some embodiments, VM instances may be provisioned on demand, to auto-scale a system in response to system demand on load conditions, or to replace unhealthy or failed VM instances. In some embodiments, the injection 544 may be performed at the same time as the VM 510 or container 520 is provisioned, so that the VM or container is able to invoke the cryptographic operation(s) as soon as they are started. In some embodiments, when a VM instance or container is stopped or fails, the provisioning system 540 may automatically cleanup the VMM 520, to remove any cryptographic keys or operations that are no longer needed by the VMs or containers hosted by that VMM.

As shown, in some embodiments, the provisioning system 540 may also register a newly provisioned VM instance or container with an identity and access management (IAM) system 260, which may be a global IAM system in the virtualization service. In some embodiments, each running VM instance or container may be assigned a unique ID in the service provider network, and the IAM system 260 may generate a credential or unique key for the instance or container upon registration. In some embodiments, the registry entry for the VM instance or container may indicate what permissions are granted to that VM instance or container. These access permissions are then enforced via the IAM system 260. In some embodiments, the key that is generated by the IAM system 260 may be used as the VM key 528 or the container key 526 for the newly provisioned instance or container, and the provision system 540 may inject these keys into the hosting VMM for the instance or container, as shown.

Figure 6:
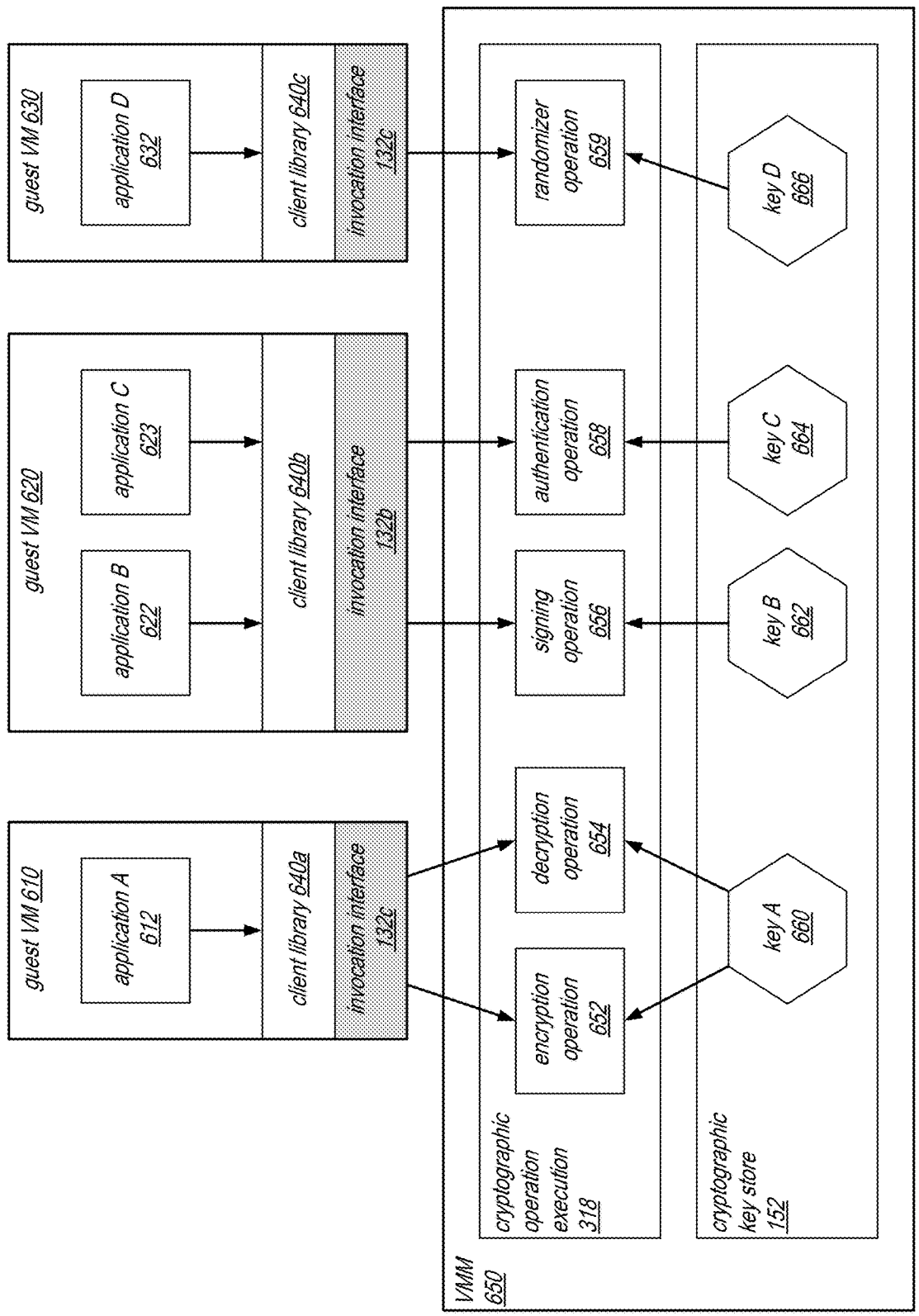
FIG. 6 illustrates some example cryptographic operations that can be performed by a VMM that securely stores cryptographic keys for guest VMs, according to some embodiments.

FIG. 6 illustrates some example cryptographic operations that can be performed by a VMM that securely stores cryptographic keys for guest VMs, according to some embodiments.

As shown, the figure depicts a guest VMs 610, 620, and 630 hosted on a VMM 650, which may be an embodiment of the VMM 140 as discussed in connection with FIG. 1. In this example, a number of different applications A, B, C, and D (612, 622, 623, and 632 respectively) are running on the guest VMs. However, instead of directly interacting with the invocation interface 132 provided by the guest VMs, in this example, the applications are interacting with a client library 640. In some embodiments, this client library 640 may be provided as part of software development kit (SDK) that is provided to developers of the applications to allow them to use the cryptographic operation features of the VMM via the invocation interface 132. The SDK or library 640 may be easier to use or program against than the invocation interface 132. In some embodiments, the client library 640 may allow different application to specify different cryptographic operation to perform, and different cryptographic keys to use, as shown. In some embodiments, the client library may be used to provide a unified set of APIs, to hide the implementational details of the invocation interface 132. For example, in some embodiments, the invocation interface 132 may vary based on the type of guest OS or the type of VMM, and may evolve over time. The client library 640 may be used to hide such variations from the application developers.

As shown, the VMM 650 in this example implements a number of different cryptographic operations, which may be configurable, as discussed previously. In some embodiments, the VMM 650 may implement an encryption operation 652 and a decryption operation 654, which may be performed based on a common key A 660. In some embodiments, the encryption and decryption may be performed using different or asymmetric keys. In some embodiments, the VMM may implement a signing operation 656, which can be used to sign a message or request. In some embodiments, the VMM may implement a verification or authentication operation, which may be used to verify or authenticate a signer of a message or request. In this example, the two operations use different keys B 662 and C 664. However, in some embodiments, the two operations may use a common key, for example, to ensure that outgoing messages and incoming messages are generated within a single group of known nodes. As shown, application D 632 uses a randomizer operation 659, which may be another type of cryptographic operation. In some embodiments, a secret key may be used to generate a random number within a requested range. In some embodiments, the randomization operation may generate a pseudorandom hash value based on an input value. No matter the type of cryptographic operation, the secret key 666 that is used to perform the cryptographic operation may be maintained by the VMM 650 in its cryptographic key store 152, as shown.

As may be appreciated by those skilled in the art, depending on the embodiment, a variety of cryptographic operations may be implemented by the VMM 650. In some embodiments, for example, a key may be used to wrap or encrypt other keys. In some embodiments, multiple keys may be used to implement a multi-layer encryption or authentication scheme. In some embodiments, a key may be a long-term key that is kept for the entire life of the guest VM or container. In some embodiments, a key may be ephemeral, for example, only valid for a single use or for a single session. In some embodiments, a key session may be negotiated by two communicating nodes for a few communication sessions. In some embodiments, a key may be rotated (i.e. changed) periodically or after a number of uses, so that the effects of key loss is minimized. For example, in some embodiments, the issuer of a credential key, such as an IAM system, may periodically change the credential key of individual VMs, and cause the keys to be reinjected to the VMM. In some embodiments, the VMM itself may be responsible for rotating the keys of its VMs, which may be controlled via configuration parameters.

Figure 7:
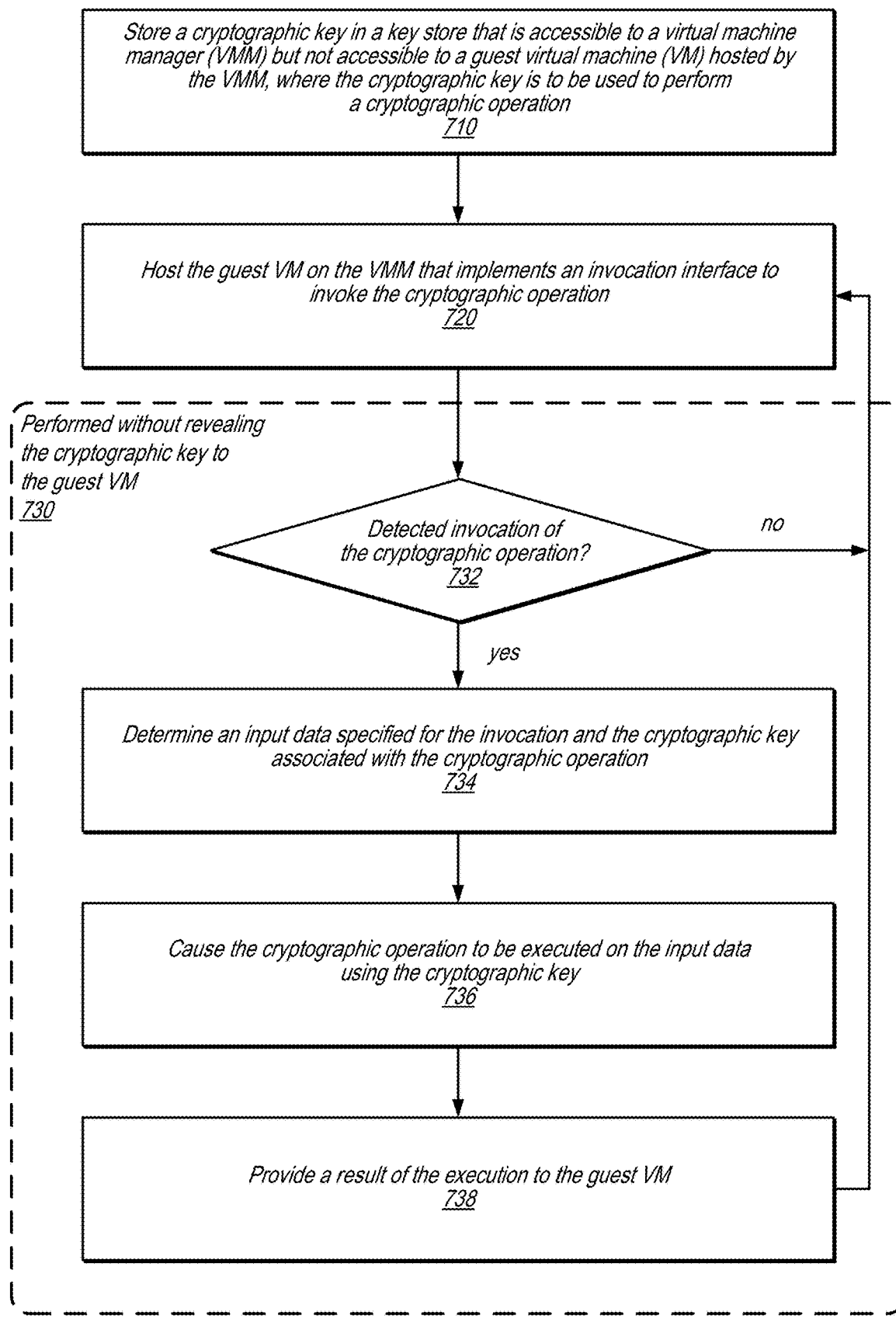
FIG. 7 is a flow diagram illustrating a process of a VMM to securely store a cryptographic key for a guest VM and perform a cryptographic operation for the guest VM, according to some embodiments.

FIG. 7 is a flow diagram illustrating a process of a VMM to securely store a cryptographic key for a guest VM and perform a cryptographic operation for the guest VM, according to some embodiments. The process depicted in the figure may be performed by some embodiments of the VMM 140, as discussed in connection with FIG. 1.

At operation 710, a cryptographic key is store in a key store that is accessible to the VMM but not accessible to a guest VM hosted by the VMM. In some embodiments, the cryptographic key is used to perform a cryptographic operation on behalf of the guest VM. In some embodiments, the key may be stored in a key store such as key store 152 of FIG. 1. In some embodiments, the key store may be used to store a number of cryptographic keys for different cryptographic operations supported by the VMM. In some embodiments, the key store may be implemented in a VMM memory space, which may be a portion of the system memory of the virtualization host that is running the VMM. In some embodiments, the key store may be inaccessible to any guest VMs hosted by the VMM. In some embodiments, the key store may be implemented within a sidecar VM hosted by the VMM, which may be specially configured to implement the key store. In some embodiments, the key store may be maintained only in the runtime memory of the virtualization host, so that it will not persist through a power cycle of the virtualization host. In some embodiments, the key store may also be stored on a persistent storage, so that it can be maintained from one power cycle to the next.

At operation 720, the guest VM is hosted on the VMM. The guest VM may implement an invocation interface to allow the guest OS or applications on the guest VM to invoke the cryptographic operation. In some embodiments, the guest VM may be the guest VM 110c of FIG. 1, and the invocation interface may be the invocation interface 132 of FIG. 1. In some embodiments, the invocation interface may be an API, an OS system call, a device driver, or a memory access interface implemented by the guest VM. In some embodiments, the guest VM may also implement a client library or SDK that provides applications a more usable interface to invoke the cryptographic operation. As discussed, the cryptographic operation may be an operation to sign or verify a message from or to the guest VM, to encrypt or decrypt a message from or to the guest VM, to perform a cryptographic computation, among other operations. In some embodiments, the cryptographic key may be part of a credential or identifier associated with the guest VM.

As shown, operations 732, 734, 736, and 738 are a group of operations 730 that implement the execution of the cryptographic operation, which are all performed without revealing the cryptographic key to the guest VM, as discussed. In some embodiments, the execution may be performed by the VMM, in a VMM memory address space that is not accessible to the guest VM. In some embodiments, the execution may be performed on a hardware cryptographic coprocessor. In some embodiments, the execution may be performed on a emulated device or sidecar VM hosted by the VMM. Advantageously, by performing the cryptographic operation in a separate memory space from the guest VM, the guest VM never obtains the cryptographic key or any intermediate data associated with the performance of the operations in its own memory space. Accordingly, the risk of exfiltration of the key from the guest VM environment is eliminated.

At operation 732, a detection is made that the cryptographic operation has been invoked. As discussed, in some embodiments, the detection may involve detecting a device request to a device driver in the guest VM, or a call to a system call from the guest VM. In some embodiments, the device request may be a request read or write a virtual cryptographic device, such as a virtual storage device or a virtual networking device implemented by the VMM. In some embodiments, the detection may involve detecting a read or a write to a particular memory location or page that is associated with the cryptographic operation. In some embodiments, a read or write to a particular memory page may be detected as a result of a page fault of the particular memory page.

At operation 734, when the invocation is detected, the input data specified for the invocation request is determined. Further, the cryptographic key associated with the invocation request is determined. In some embodiments, the input data may be passed to the VMM as an explicitly parameter to a system call exposed by the invocation interface. In some embodiments, the input data may be a data to be written or read from a storage device or memory location. In some embodiments, the input data may be a network data to be sent from or forwarded to the guest VM. The cryptographic key may be determined in a number of different ways. In some embodiments, there is only one key that is associated with a guest VM or a container, and the VMM may determine the key to use based on a source identifier of the invocation. In some embodiments, the invocation request may specify a particular key to use for the cryptographic operation. In some embodiments, the identification of the key to use may be based on particular properties of a device request. For example, a write to a particular block of a virtual storage device may imply a particular cryptographic operation and/or particular cryptographic key. As another example, a write to a particular port of a virtual network device may imply a particular cryptographic operation and/or particular cryptographic key. In some embodiments, the cryptographic operation may take no input data.

At operation 736, the VMM causes the cryptographic operation to be executed on the input data using the cryptographic key. As discussed, the cryptographic operation is executed in a memory space of the VM, or in some embodiments, in a separate cryptographic coprocessor. In any case, the execution is performed in a memory space that is not accessible to the guest VM, so that the guest VM never obtains the cryptographic key.

At operation 738, a result of the execution of the cryptographic operation is provided back to the guest VM. In some embodiments, the result may be provided via the invocation interface. In some embodiments, the result may be written to a location that is accessible by the guest VM. For example, the result may be written to a memory space of the guest VM, or a device location accessible by the guest VM. For example, in the case of an invocation interface that is a memory access interface, the result may be written to the same memory address or page that was used to invoke the cryptographic operation, or a known address or location specified by the invocation protocol. It is noted that in some embodiments, the VMM may not provide a result of the cryptographic operation back to the guest VM. For example, in some embodiments, the VMM may implement a virtual network interface card that simply performs the cryptographic operation and sends the results of the cryptographic operation onto the network. The guest VM may not receive the actual results of the cryptographic operation, other than an acknowledgement that the message was sent.

Figure 8:
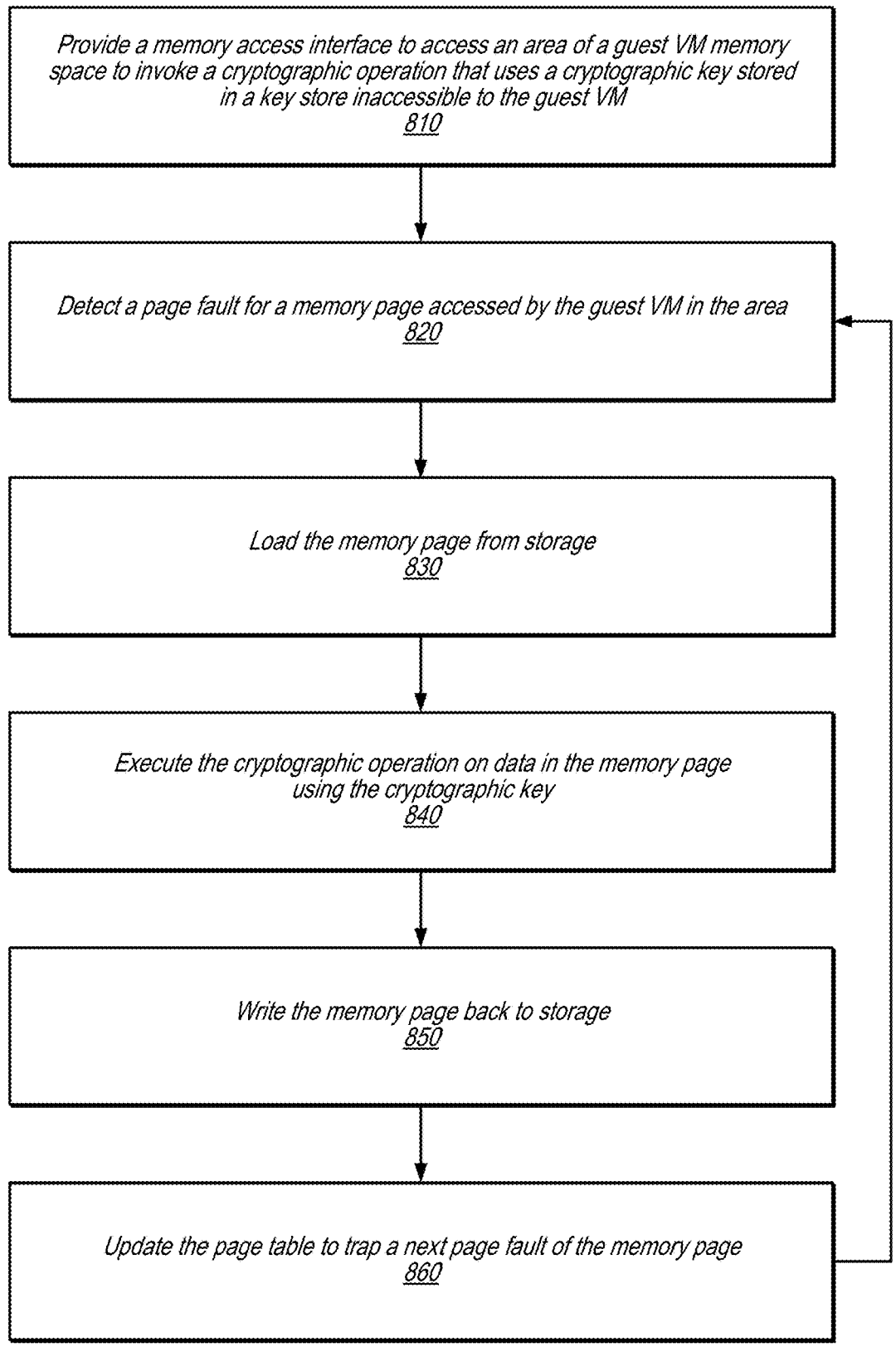
FIG. 8 is a flow diagram illustrating a process of a VMM to securely perform a cryptographic operation for a guest VM in response to detection of a page fault, according to some embodiments.

FIG. 8 is a flow diagram illustrating a process of a VMM to securely perform a cryptographic operation for a guest VM in response to detection of a page fault, according to some embodiments. The process depicted in the figure may be performed by some embodiments of the VMM 140, as discussed in connection with FIG. 1.

The process begins at operation 810, where a memory access interface is provided to access an area of a guest VM memory space to invoke a cryptographic operation that uses a cryptographic key stored in a key store that is inaccessible to the guest VM. In some embodiments, the key store may be stored in a memory space of a VMM hosting the guest VM, such as memory space 150 of FIG. 1. In some embodiments, the memory access interface may be the interface 422 of FIG. 4A. In some embodiments, the memory access interface may be a special OS call interface provided by the OS of the guest VM, which may include special calls to execute the cryptographic operation when accessing the guest VM memory. In some embodiments, the memory access interface may be the standard as the memory access interface of the guest OS without any special modifications for the cryptographic operation. However, the VMM may be modified to implement a special semantic for the memory where, for example, a particular designated area of the guest VM memory will trigger or invoke the cryptographic operation. For example, it may be understood by applications that when a particular designated area of the guest VM memory (or some portion of the allocated application memory space) is written, the cryptographic operation will be performed on the data written to that area of the memory.

At operation 820, a page fault is detected for a memory page that was accessed by the guest VM in the special memory area. In some embodiments, as discussed in connection with FIG. 4B, the VMM may only hold in memory a subset of the memory pages allocated to the guest VMs. When a memory page needed by a guest VM is not in the VMM's memory, a page fault is generated, which is trapped by the VMM to load the memory page into the VMM's memory space. In some embodiments, the page fault mechanism may be used as a way of detecting an invocation of the cryptographic operation from the guest VM. In some embodiments, a subset of memory pages provided to a guest VM may be specially managed to always cause a page fault. Accordingly, any reads or writes to those pages from the guest VM will cause a page fault to trigger some handling routine in the VMM.

At operation 830, in response to the detected page fault, the memory page is loaded from storage. In some embodiments, the step may be skipped where the interrupt handling routing of the page fault completely overwrites the standard interrupt handling routine. However, in some embodiments, the page fault may be handled as normal, and the memory page may be loaded into the VMM's memory space.

At operation 840, the cryptographic operation is executed on the data in the memory page that has been loaded using the cryptographic key. As discussed, the cryptographic operation may be performed in a memory that is inaccessible to the guest VM, so the guest VM does not obtain the cryptographic key or any intermediate data associated with the execution. In some embodiments, if the memory operation is a write, the input data for the write may be transformed using the cryptographic operation, and the resulting data may be stored in the memory page. In some embodiments, if the invoking operation is a read operation, the cryptographic operation may be applied directly to the data in the memory page as loaded, and the transformed data is then written back to the memory page to be made visible to the guest VM. In some embodiments, the cryptographic operation may be executed using the virtual cryptographic device 156 of FIG. 1, and/or the cryptographic operation execution module 318 of FIG. 3A.

At operation 850, in some embodiments, the memory page is written back to storage. In some embodiments, where the invoking operation is a memory write, the VMM may semantically require that a page in the VMM's runtime memory is consistent with the page on storage. However, in some embodiments, the writeback to storage may not need to occur immediately, and may be performed asynchronously from the cryptographic operation. In some embodiments, if the invoking operation is a read operation, the VMM may not perform operation 850. Rather, the VMM may implement the operation such that it is always applied upon a memory read, and the actual (persisted) state of the memory page may remain untransformed.

At operation 860, in some embodiments, the page table is updated so a next page fault of the memory page is trapped. In some embodiments, the page table may be page table 460 of FIG. 4B. As discussed, in some embodiments, the page table may provide a translation or mapping between the page numbers or memory addresses between guest VM memory pages and VMM memory pages. In some embodiments, whether a page is in VMM memory or not may be indicated via a metadata flag. Thus, by always setting the flag to "not in memory," each access to the memory page will cause a page fault. In some embodiments, operation 860 may not be necessary, as the desired behavior of always generating a page fault may be achieved via static configuration means of the VMM's memory manager. As shown, after the cryptographic operation is handled in response to the memory operation, the process loops back to operation 820, where another memory access to invoke a cryptographic operation is detected.

Figure 9:
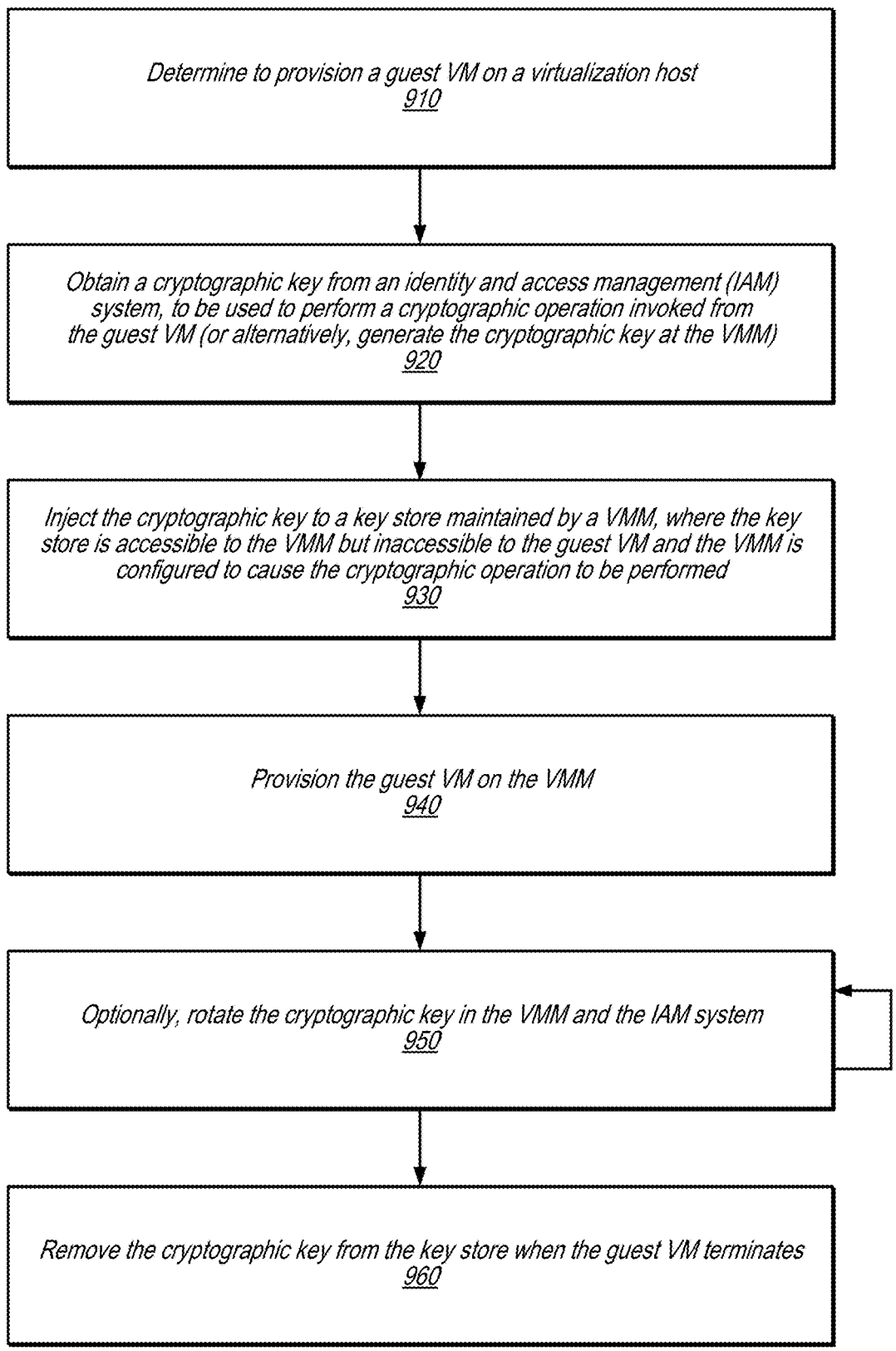
FIG. 9 is a flow diagram illustrating a process of provisioning a guest VM on a VMM that securely stores a cryptographic key for the guest VM and performs a cryptographic operation for the guest VM, according to some embodiments.

FIG. 9 is a flow diagram illustrating a process of provisioning a guest VM on a VMM that securely stores a cryptographic key for the guest VM and performs a cryptographic operation for the guest VM, according to some embodiments. The process depicted in the figure may be performed by some embodiments of the VMM 140, as discussed in connection with FIG. 1, and the provisioning system 540 and IAM system 260, as discussed in connection with FIG. 5.

At operation 910, a determination is made to provision a guest VM on a virtualization host. In some embodiments, the determination may be made by a provisioning system such as provisioning system 540 of FIG. 5, which may be implemented as part of a control plane of a virtualization service provider network. Guest VMs may be provisioned under a variety of conditions. In some embodiments, a guest VM may be provisioned in response to an explicit request ay a client or another service. In some embodiments, a guest VM may be provisioned in accordance with an auto-scaling policy, which may specify that guest VMs should be added to one or more instance pools in response to system load conditions. In some embodiments, such a pool may be implemented as part of a cloud-based service, such as the serverless execution service 240 of FIG. 2. In some embodiments, such as pool may automatically replace its VM instances that have gone down, are unhealthy, or simply for routine maintenance reasons, by provisioning new VM instances.

At operation 920, once it is decided that a new VM instance is to be provisioned, a cryptographic key is obtained for the new guest VM. In some embodiments, the key may be obtained from an IAM system of the service provider network, such as for example IAM system 260 of FIG. 2. In some embodiments, the IAM system 260 may generate credentials or unique signing keys for each newly provisioned VM. In some embodiments, the cryptographic key may instead be generated without an IAM system, for example, by the VMM that is selected to launch the new guest VM. In some embodiments, the VMM may be configured to simply generate a unique key for each new VM, or pick a key for the new VM from a global list of unused keys.

At operation 930, if the cryptographic key is generated off of the VMM, the key is injected into a key store maintained by the VMM. As discussed, this key store is designed so that it is inaccessible directly from the guest VM, except the guest VM may invoke the cryptographic operation to indirectly use the key. In some embodiments, as discussed, the VMM is also configured to perform the cryptographic operation in its own memory space, or cause the cryptographic operation to be performed in some other memory space inaccessible to the guest VM (e.g., by a sidecar VM hosted by the VMM).

At operation 940, the guest VM is provisioned on the VMM. In some embodiments, this operation may include actually launching the guest VM, and hosting the guest VM to support its operations. During the hosting, the VMM may perform cryptographic operations on behalf of the guest VM, when requested, using the cryptographic key stored for the operation. As discussed, in some embodiments, the actual execution of the cryptographic operation may be performed in part using another device, such as a cryptographic coprocessor.

At operation 950, optionally, the VMM may rotate the cryptographic key for the guest VM, both in the key store and the IAM system (if the key is also registered with the IAM system). In some embodiments, the rotation may be performed by the IAM system, in which case the new key will be reinjected into the VMM. The rotation of the key may be performed in accordance with a variety of different key rotation policies, to enhance security within the system. For example, in some embodiments, each key associated with a guest VM may be changed periodically (e.g. once a month), or at random time intervals. In some embodiments, a key may be changed after some number of uses (e.g. some number of cryptographic operations).

At operation 960, when the guest VM terminates (either normally or abnormally due to some error), the VMM may remove the cryptographic key for the guest VM from its key store. In some embodiments, this removal of orphaned keys will reduce the storage space of the key store and also reduce the possibility that a rogue VM instance can take over the identity of a terminated VM to perform unauthorized activities. In this manner, the virtualization service can easily and securely manage the cryptographic keys associated with its VM instances, without having to resort to expensive hardware security devices that are not readily scalable or configurable.

Figure 10:
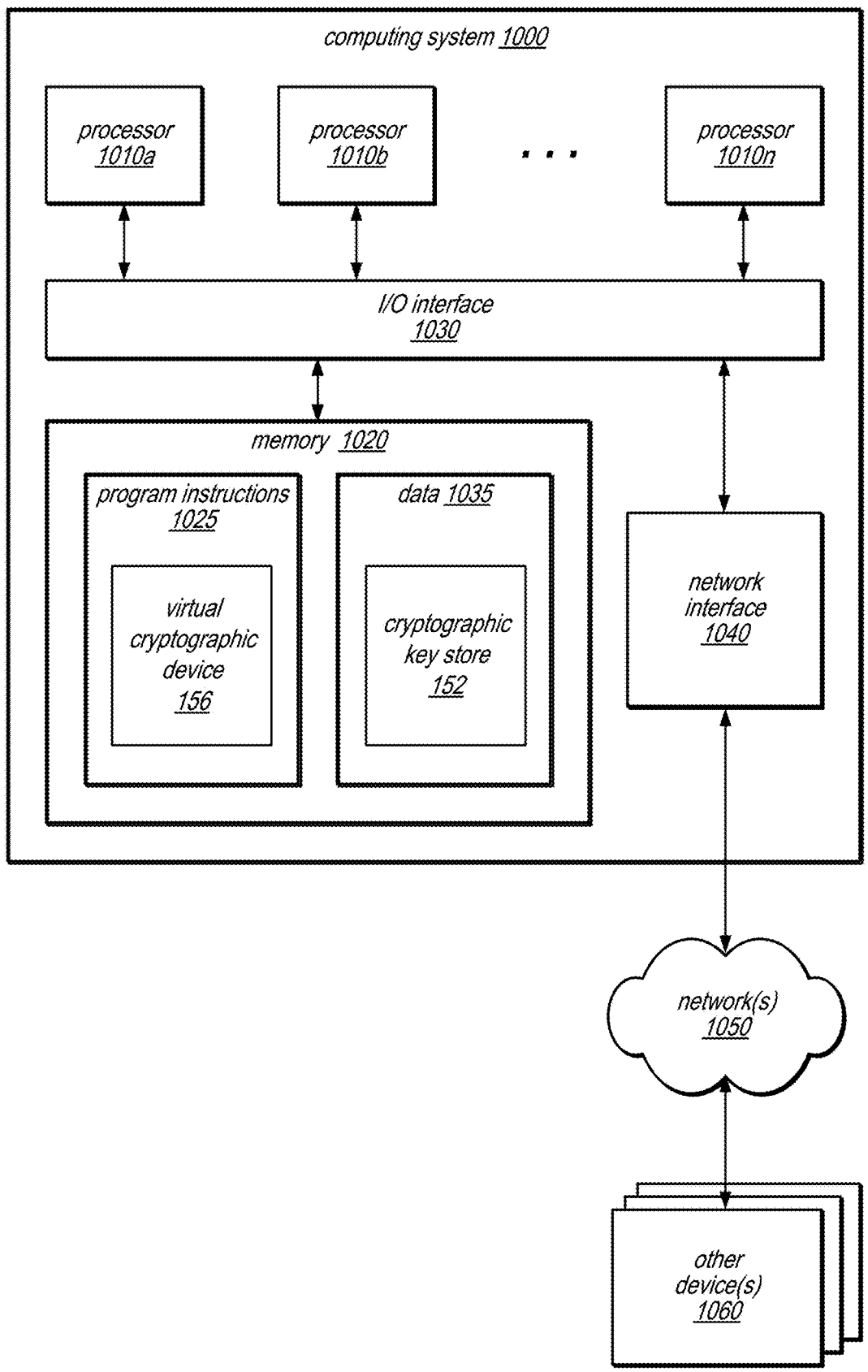
FIG. 10 is a block diagram illustrating an example computer system that can be used to implement a VMM that securely stores cryptographic keys for guest VMs and performs cryptographic operations for the guest VMs, according to some embodiments.

FIG. 10 is a block diagram illustrating an example computer system that can be used to implement a VMM that securely stores cryptographic keys for guest VMs and performs cryptographic operations for the guest VMs, according to some embodiments. Computer system 1000 may include or be configured to access one or more nonvolatile computer-accessible media. In the illustrated embodiment, computer system 1000 includes one or more processors 1010 coupled to a system memory 1020 via an input/output (I/O) interface 1030. Computer system 1000 further includes a network interface 1040 coupled to I/O interface 1030.

In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

System memory 1020 may be configured to store instructions and data accessible by processor(s) 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 1020 as code 1025 and data 1035. The system memory 1020 may include different levels of cache, some of which may be located on the CPU and some away from the CPU. One level of the cache hierarchy may be a last level cache that is shared by all of the processors 1010a to 1010n. The last level cache may be an inclusive cache of the low levels of cache in the cache hierarchy.

As shown, in some embodiments, the program instructions 1025 may store one or more in-memory modules that implement the virtual cryptographic device 156, as discussed in connection with FIG. 1. As discussed, in some embodiments, the virtual cryptographic device 156 may be implemented by the VMM, and may be a purely virtual device. In some embodiments, the virtual cryptographic device 156 may be backed by an actual physical device, such as a storage device or network interface card, and augment the functions of those devices by performing one or more cryptographic operations. As discussed, in some embodiments, the actual execution of the cryptographic operation may be performed in a memory other than memory 1020 of the physical host executing the VMM. For example, the actual execution of the cryptographic operation may occur on another hardware device, such as a cryptographic coprocessor or a specialized device such as a network interface card specially adapted to perform the cryptographic operation.

As shown, in some embodiments, the data 1035 may store the cryptographic key store 152, as discussed in connection with FIG. 1. As discussed, the key store 152 may be maintained in a portion of the system memory that is accessible to the VMM, but is not accessible to the guest VMs. In some embodiments, the VMM itself may be another process running on the host OS, and may be allocated memory pages by the host OS. The VMM may reserve some portion of its allocated memory for its own use, and never allocate that portion to any of the guest VMs. Accordingly, the cryptographic key store 152 may be implemented in that portion of the VMM's memory space that is inaccessible to the guest VMs. Advantageously, the key store 152 is implemented using the main memory of the virtualization host, and not using other hardware security devices such as specialized CPUs, HSMs, TPMs, and the like. As discussed, such specialized hardware devices are not readily scalable and adaptable for virtualization environments that host large numbers of virtual machines for different clients.

In one embodiment, I/O interface 1030 may be configured to coordinate I/O traffic between processor 1010, system memory 1020, and any peripheral devices in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices 1060 attached to a network or networks 1050, such as other computer systems or devices, such as routers and other computing devices, as illustrated in FIGS. 1 through 9, for example. In various embodiments, network interface 1040 may support communication via any suitable wired or wireless general data networks, such as types of Ethernet network, for example. Additionally, network interface 1040 may support communication via telecommunications/telephony networks such as analog voice networks or digital fiber communications networks, via storage area networks such as Fibre Channel SANs, or via any other suitable type of network and/or protocol.

In some embodiments, system memory 1020 may be one embodiment of a computer-accessible medium configured to store program instructions and data as described above for FIGS. 1 through 9 for implementing embodiments of methods and apparatus for traffic analysis. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1000 via I/O interface 1030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

The invention claimed is:

1. A system comprising:
one or more computers comprising one or more processors and a system memory that implement a virtual machine monitor (VMM), configured to:
host at least one guest virtual machine (VM) configured to specify, via an invocation interface implemented by the guest VM, a cryptographic operation to be executed using a cryptographic key, wherein the cryptographic operation is a signing operation that signs requests issued from the guest VM with the cryptographic key, and the cryptographic key is unique to the guest VM;
implement a key store configured to store the cryptographic key, wherein the key store is a portion of the system memory accessible to the VMM but not accessible to the guest VM; and
implement a virtual cryptographic device, configured to:
detect an invocation of the cryptographic operation by the guest VM;
responsive to the invocation, cause the cryptographic operation to be executed using the cryptographic key in the key store, wherein the execution does not reveal the cryptographic key to the guest VM; and
provide a result of the execution of the cryptographic operation to the guest VM.

2. The system of claim 1, wherein:
the guest VM is hosted in a network-accessible service provider network configured to provide a plurality of services; and
the guest VM is configured to send signed requests to one or more other services in the network-accessible service provider network, and the one or more other services are configured to authenticate the signed requests.

3. The system of claim 1, wherein to cause the cryptographic operation to be executed, the VMM is configured to execute the cryptographic operation via a hardware cryptographic coprocessor.

4. The system of claim 1, wherein the guest VM implements a paravirtualized device driver for the virtual cryptographic device.

5. The system of claim 1, wherein:
the virtual cryptographic device provides a memory space accessible to the guest VM;
to detect the invocation of the cryptographic operation by the guest VM, the virtual cryptographic device is configured to detect an input data for the cryptographic operation written to a specific location in the memory space; and
to provide the result of the execution of the cryptographic operation, the virtual cryptographic device is configured to write the result to the specific location.

6. A computer-implemented method, comprising:
performing, by one or more computers comprising one or more processors and a system memory that implement a virtual machine monitor (VMM):
hosting at least one guest virtual machine (VM) configured to specify, via an invocation interface implemented by the guest VM, a cryptographic operation to be executed using a cryptographic key, wherein the cryptographic operation is a signing operation that signs requests issued from the guest VM with the cryptographic key, and the cryptographic key is unique to the guest VM;
storing the cryptographic key in a key store stored in a portion of the system memory accessible to the VMM but not accessible to the guest VM;
detecting an invocation of the cryptographic operation by the guest VM; and
responsive to the invocation, causing the cryptographic operation to be executed using the cryptographic key, wherein the execution does not reveal the cryptographic key to the guest VM.

7. The method of claim 6, wherein the invocation interface exposes multiple cryptographic operations including the signing operation, an authentication operation, an encryption operation, and a decryption operation.

8. The method of claim 6, wherein:
the guest VM is used to implement a serverless execution service in a network-accessible service provider network;
the serverless execution service is configured to, responsive to a client request, provision the guest VM from a pool of unprovisioned VM instances to execute a client-defined function;
the client-defined function causes the guest VM to issue one or more request to one or more resources in the network-accessible service provider network; and
the client-defined function uses the cryptographic operation to sign the one or more requests with a credential associated with the guest VM.

9. The method of claim 6, wherein the detecting the invocation of the cryptographic operation comprises detecting a device request to device driver for a virtual cryptographic device implemented by the VMM.

10. The method of claim 9, wherein the device driver comprises a paravirtualized device driver.

11. The method of claim 6, wherein detecting the invocation of the cryptographic operation comprises detecting a device request to a peripheral component interconnect (PCI) passthrough device driver to a hardware PCI device, and the execution of the cryptographic operation is performed by the underlying hardware PCI device.

12. The method of claim 9, further comprising performing, by the VMM:
sending a result data from executing the cryptographic operation on an input data to an underlying hardware device, wherein the underlying hardware device comprises at least one of a storage device or a network interface.

13. The method of claim 6, wherein:

the storing of the cryptographic key comprises storing the cryptographic key in a memory of a sidecar VM hosted by the VMM; and the causing of the cryptographic operation to be executed comprises causing the cryptographic operation to be executed by the sidecar VM.

14. The method of claim 6, wherein:

the guest VM implements a memory access interface to access a memory space;

the detecting of the invocation of the cryptographic operation comprises detecting a write to a specific location in the memory space; and the method further comprises writing, by the VMM, a result data of the cryptographic operation back to the specific location of the memory space.

15. The method of claim 14, wherein:

the specific location is a memory page in the memory space; and the detecting of the invocation of the cryptographic operation comprises detecting, by the VMM, a page fault for the memory page.

16. The method of claim 6, wherein:

the cryptographic operation is an encryption operation to encrypt a message using the cryptographic key or a decrypt operation to decrypt a message using the cryptographic key.

17. The method of claim 6, further comprising:

receiving, via a configuration interface of the VMM, a client cryptographic key to be used to perform a client cryptographic operation in a client application to be executed on the guest VM;

storing the client cryptographic key in the key store; and in response to detection of an invocation of the client cryptographic operation by the client application running on the guest VM, causing the client cryptographic operation to be executed using the client cryptographic key and without revealing the client cryptographic key to the guest VM.

18. One or more non-transitory computer-accessible storage media storing program instructions that when executed on or across one or more processors of a virtualization host cause the virtualization host to implement a virtual machine monitor (VMM) to:

host at least one guest virtual machine (VM) configured to specify, via an invocation interface implemented by the guest VM, a cryptographic operation to be executed using a cryptographic key, wherein the cryptographic operation is a signing operation that signs requests issued from the guest VM with the cryptographic key, and the cryptographic key is unique to the guest VM;

store the cryptographic key in a key store stored in a portion of a system memory of the virtualization host, wherein the key store is accessible to the VMM but not accessible to the guest VM;

detect an invocation of the cryptographic operation by the guest VM; and responsive to the invocation, cause the cryptographic operation to be executed using the cryptographic key, wherein the execution is performed without revealing the cryptographic key to the guest VM.

19. The one or more non-transitory computer-accessible storage media of claim 18, wherein to detect the invocation of the cryptographic operation, the program instructions when executed on or across the one or more processors cause the VMM to:

detect a device request to a device driver for a virtual cryptographic device implemented by the VMM.

20. The one or more non-transitory computer-accessible storage media of claim 18, wherein:

the guest VM implements a memory access interface to access a memory space;

to detect the invocation of the cryptographic operation, the program instructions when executed on or across the one or more processors cause the VMM to detect a write to a specific location in the memory space; and the program instructions when executed on or across the one or more processors cause the VMM to write a result data of the cryptographic operation back to the specific location of the memory space.

* * * * *